(12) United States Patent
Marggraff et al.

(10) Patent No.: US 7,831,933 B2
(45) Date of Patent: Nov. 9, 2010

(54) METHOD AND SYSTEM FOR IMPLEMENTING A USER INTERFACE FOR A DEVICE EMPLOYING WRITTEN GRAPHICAL ELEMENTS

(75) Inventors: James Marggraff, Lafayette, CA (US); Alexander Chisholm, San Francisco, CA (US); Tracy L. Edgecomb, Berkeley, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 0 days.

(21) Appl. No.: 11/034,491

(22) Filed: Jan. 12, 2005

(65) Prior Publication Data

US 2006/0067577 A1    Mar. 30, 2006

Related U.S. Application Data

(63) Continuation-in-part of application No. 10/803,806, filed on Mar. 17, 2004, and a continuation-in-part of application No. 10/861,243, filed on Jun. 3, 2004.

(51) Int. Cl.
*G06F 3/033* (2006.01)
*G06F 3/03* (2006.01)
(52) U.S. Cl. .................. 715/863; 434/317; 345/156; 345/173; 345/179; 345/180; 715/200; 715/776
(58) Field of Classification Search .............. 715/863, 715/500.1, 776; 345/156, 173, 179–180; 434/317
See application file for complete search history.

(56) References Cited

U.S. PATENT DOCUMENTS

| | | | |
|---|---|---|---|
| 2,182,334 | A | 12/1939 | Crespo |
| 2,932,907 | A | 4/1960 | Stieber et al. |
| 3,292,489 | A | 12/1966 | Johnson et al. |
| 3,304,612 | A | 2/1967 | Proctor et al. |
| 3,530,241 | A | 9/1970 | Ellis |
| 3,591,718 | A | 7/1971 | Asano |
| 3,782,734 | A | 1/1974 | Krainin |
| 3,798,370 | A | 3/1974 | Hurst |
| 3,911,215 | A | 10/1975 | Hurst et al. |

(Continued)

FOREIGN PATENT DOCUMENTS

CN    1142471    7/2001

(Continued)

OTHER PUBLICATIONS

Kramer, "Translucent Patches-Dissolving Windows", Nov. 2, 1994 Symposium on user interface software and technology. pp. 121-130,XP000197943.

(Continued)

*Primary Examiner*—Steven B Theriault

(57) ABSTRACT

A method and system for implementing a user interface for a device through user created graphical elements. The method includes recognizing a graphical element icon created by a user. Once recognized, a function related to the graphical element icon is accessed and an output in accordance with the function is provided. The function is persistently associated with the graphical element icon. Menu selection and navigation is implemented through interaction with the graphic element icon. A listing of options associated with the graphical element icon is audibly rendered. In response to a selection of one of the options, the selected option is invoked.

95 Claims, 8 Drawing Sheets

U.S. PATENT DOCUMENTS

| | | |
|---|---|---|
| 3,921,165 A | 11/1975 | Dym |
| 4,079,194 A | 3/1978 | Kley |
| 4,220,815 A | 9/1980 | Gibson et al. |
| 4,337,375 A | 6/1982 | Freeman |
| 4,375,058 A | 2/1983 | Bouma et al. |
| 4,425,099 A | 1/1984 | Naden |
| 4,464,118 A | 8/1984 | Scott et al. |
| 4,492,819 A | 1/1985 | Rodgers et al. |
| 4,570,149 A | 2/1986 | Thornburg et al. |
| 4,603,231 A | 7/1986 | Reiffel et al. |
| 4,604,058 A | 8/1986 | Fisher et al. |
| 4,604,065 A | 8/1986 | Frazer et al. |
| 4,627,819 A | 12/1986 | Burrows |
| 4,630,209 A | 12/1986 | Saito et al. |
| 4,650,926 A | 3/1987 | Nakamura et al. |
| 4,686,332 A | 8/1987 | Greanias et al. |
| 4,739,299 A | 4/1988 | Eventoff et al. |
| 4,748,318 A | 5/1988 | Bearden et al. |
| 4,787,040 A | 11/1988 | Ames et al. |
| 4,839,634 A | 6/1989 | More et al. |
| 4,841,387 A | 6/1989 | Rindfuss |
| 4,853,494 A | 8/1989 | Suzuki |
| 4,853,498 A | 8/1989 | Meadows et al. |
| 4,853,499 A | 8/1989 | Watson |
| 4,913,463 A | 4/1990 | Tlapek et al. |
| 4,922,061 A | 5/1990 | Meadows et al. |
| 4,924,387 A | 5/1990 | Jeppesen |
| 4,964,167 A | 10/1990 | Kunizawa et al. |
| 4,990,093 A | 2/1991 | Frazer et al. |
| 5,007,085 A | 4/1991 | Greanias et al. |
| 5,030,117 A | 7/1991 | Delorme |
| 5,053,585 A | 10/1991 | Yaniger |
| 5,057,024 A | 10/1991 | Sprott et al. |
| 5,113,178 A | 5/1992 | Yasuda et al. |
| 5,117,071 A | 5/1992 | Greanias et al. |
| 5,128,525 A | 7/1992 | Stearns et al. |
| 5,149,919 A | 9/1992 | Greanias et al. |
| 5,168,147 A | 12/1992 | Bloomberg |
| 5,184,003 A | 2/1993 | McMillin et al. |
| 5,194,852 A | 3/1993 | More et al. |
| 5,209,665 A * | 5/1993 | Billings et al. ............... 434/169 |
| 5,217,376 A | 6/1993 | Gosselin |
| 5,217,378 A | 6/1993 | Donovan |
| 5,220,136 A | 6/1993 | Kent |
| 5,220,649 A | 6/1993 | Forcier |
| 5,221,833 A | 6/1993 | Hecht |
| 5,250,930 A | 10/1993 | Yoshida et al. |
| 5,301,243 A | 4/1994 | Olschafskie et al. |
| 5,314,336 A | 5/1994 | Diamond et al. |
| 5,356,296 A * | 10/1994 | Pierce et al. ................. 434/317 |
| 5,401,916 A | 3/1995 | Crooks |
| 5,406,307 A * | 4/1995 | Hirayama et al. ........... 715/800 |
| 5,409,381 A * | 4/1995 | Sundberg et al. ............ 434/159 |
| 5,413,486 A * | 5/1995 | Burrows et al. ............. 434/317 |
| 5,417,575 A | 5/1995 | McTaggart |
| 5,438,168 A | 8/1995 | Wolfe et al. |
| 5,438,662 A * | 8/1995 | Randall ...................... 715/776 |
| 5,466,158 A * | 11/1995 | Smith, III .................... 434/317 |
| 5,474,457 A * | 12/1995 | Bromley ...................... 434/311 |
| 5,480,306 A | 1/1996 | Liu |
| 5,484,292 A | 1/1996 | McTaggart |
| 5,485,176 A | 1/1996 | Ohara et al. |
| 5,509,087 A | 4/1996 | Nagamine |
| 5,510,606 A | 4/1996 | Worthington et al. |
| 5,517,579 A | 5/1996 | Baron et al. |
| 5,520,544 A * | 5/1996 | Manico et al. .............. 434/317 |
| 5,561,446 A | 10/1996 | Montlick |
| 5,572,651 A * | 11/1996 | Weber et al. ................. 715/863 |
| 5,574,519 A | 11/1996 | Manico et al. |
| 5,574,804 A | 11/1996 | Olschafskie et al. |
| 5,575,659 A | 11/1996 | King et al. |
| 5,596,698 A | 1/1997 | Morgan |
| 5,604,517 A | 2/1997 | Filo |
| 5,624,265 A | 4/1997 | Redford et al. |
| 5,629,499 A | 5/1997 | Flickinger et al. |
| 5,635,726 A | 6/1997 | Zavislan et al. |
| 5,636,995 A | 6/1997 | Sharpe, III et al. |
| 5,640,193 A * | 6/1997 | Wellner ...................... 725/100 |
| 5,649,023 A | 7/1997 | Barbara et al. |
| 5,652,412 A | 7/1997 | Lazzouni et al. |
| 5,652,714 A * | 7/1997 | Peterson et al. ............... 702/57 |
| 5,661,506 A * | 8/1997 | Lazzouni et al. ............. 345/179 |
| 5,663,748 A * | 9/1997 | Huffman et al. ............. 345/173 |
| 5,666,214 A | 9/1997 | MacKinlay et al. |
| 5,686,705 A | 11/1997 | Conroy et al. |
| 5,694,102 A | 12/1997 | Hecht |
| 5,697,793 A * | 12/1997 | Huffman et al. ............. 434/317 |
| 5,698,822 A | 12/1997 | Haneda et al. |
| 5,717,939 A | 2/1998 | Bricklin et al. |
| 5,730,602 A | 3/1998 | Gierhart et al. |
| 5,739,814 A | 4/1998 | Ohara et al. |
| 5,757,361 A | 5/1998 | Hirshik |
| 5,760,773 A | 6/1998 | Berman et al. |
| 5,767,457 A | 6/1998 | Gerpheide et al. |
| 5,788,508 A | 8/1998 | Lee et al. |
| 5,790,114 A | 8/1998 | Geaghan et al. |
| 5,801,687 A * | 9/1998 | Peterson et al. ............ 715/500.1 |
| 5,835,726 A | 11/1998 | Shwed et al. |
| 5,847,698 A | 12/1998 | Reavey et al. |
| 5,852,434 A | 12/1998 | Sekendur |
| 5,855,483 A | 1/1999 | Collins et al. |
| 5,877,458 A | 3/1999 | Flowers |
| 5,889,506 A | 3/1999 | Lopresti et al. |
| 5,896,403 A | 4/1999 | Nagasaki et al. |
| 5,902,968 A * | 5/1999 | Sato et al. .................. 178/19.01 |
| 5,903,729 A * | 5/1999 | Reber et al. .................. 709/219 |
| 5,910,009 A * | 6/1999 | Leff et al. .................... 434/322 |
| 5,914,707 A | 6/1999 | Kono |
| 5,932,863 A | 8/1999 | Rathus et al. |
| 5,933,829 A | 8/1999 | Durst et al. |
| 5,951,298 A * | 9/1999 | Werzberger .................. 434/178 |
| 5,957,697 A * | 9/1999 | Iggulden et al. ............. 434/317 |
| 5,960,124 A | 9/1999 | Taguchi et al. |
| 5,963,199 A | 10/1999 | Kato et al. |
| 5,963,208 A * | 10/1999 | Dolan et al. ................. 715/760 |
| 5,973,420 A | 10/1999 | Kaiserman et al. |
| 5,974,558 A * | 10/1999 | Cortopassi et al. .......... 713/323 |
| 5,978,773 A | 11/1999 | Hudetz et al. |
| 5,992,817 A | 11/1999 | Klitsner et al. |
| 5,997,309 A | 12/1999 | Metheny et al. |
| 6,000,613 A | 12/1999 | Hecht et al. |
| 6,000,621 A | 12/1999 | Hecht et al. |
| 6,008,799 A | 12/1999 | Van Kleeck |
| 6,009,393 A | 12/1999 | Sasaki |
| 6,018,656 A | 1/2000 | Shirai |
| 6,020,895 A | 2/2000 | Azami |
| 6,021,306 A * | 2/2000 | McTaggart ................... 434/317 |
| 6,041,215 A * | 3/2000 | Maddrell et al. ............. 434/317 |
| 6,052,117 A * | 4/2000 | Ohara et al. ................. 345/173 |
| 6,064,855 A * | 5/2000 | Ho ............................... 434/317 |
| 6,072,476 A * | 6/2000 | Harada et al. ............... 345/204 |
| 6,076,734 A * | 6/2000 | Dougherty et al. ..... 235/462.01 |
| 6,076,738 A | 6/2000 | Bloomberg et al. |
| 6,081,261 A * | 6/2000 | Wolff et al. .................. 345/179 |
| 6,088,023 A * | 7/2000 | Louis et al. .................. 345/173 |
| 6,089,943 A | 7/2000 | Lo |
| 6,094,197 A | 7/2000 | Buxton et al. |
| 6,100,877 A | 8/2000 | Chery et al. |
| 6,104,387 A | 8/2000 | Chery et al. |
| 6,104,388 A | 8/2000 | Nagai et al. |
| 6,124,851 A * | 9/2000 | Jacobson ...................... 345/206 |
| 6,130,666 A | 10/2000 | Persidsky |
| 6,144,371 A | 11/2000 | Clary et al. |
| 6,148,173 A * | 11/2000 | Bell .............................. 434/309 |

| Patent | Date | Inventor | Class |
|---|---|---|---|
| 6,164,534 A | 12/2000 | Rathus et al. | |
| 6,164,541 A | 12/2000 | Dougherty et al. | |
| 6,181,329 B1* | 1/2001 | Stork et al. | 345/179 |
| 6,183,262 B1 | 2/2001 | Tseng | |
| 6,199,042 B1 | 3/2001 | Kurzweil | |
| 6,199,048 B1 | 3/2001 | Hudetz et al. | |
| 6,201,903 B1 | 3/2001 | Wolff et al. | |
| 6,201,947 B1 | 3/2001 | Hur et al. | |
| 6,208,771 B1 | 3/2001 | Jared et al. | |
| 6,215,476 B1 | 4/2001 | Depew et al. | |
| 6,215,901 B1 | 4/2001 | Schwartz | |
| 6,218,964 B1* | 4/2001 | Ellis | 340/990 |
| 6,241,528 B1 | 6/2001 | Myers | |
| 6,252,564 B1* | 6/2001 | Albert et al. | 345/1.3 |
| 6,256,638 B1* | 7/2001 | Dougherty et al. | 707/104.1 |
| 6,262,711 B1 | 7/2001 | Cohen et al. | |
| 6,262,719 B1* | 7/2001 | Bi et al. | 345/179 |
| 6,275,301 B1 | 8/2001 | Bobrow et al. | |
| 6,297,812 B1* | 10/2001 | Ohara et al. | 345/173 |
| 6,297,824 B1* | 10/2001 | Hearst et al. | 715/848 |
| 6,304,667 B1 | 10/2001 | Reitano | |
| 6,304,898 B1 | 10/2001 | Shiigi | |
| 6,304,989 B1 | 10/2001 | Kraus et al. | |
| 6,313,828 B1 | 11/2001 | Chombo | |
| 6,322,369 B1* | 11/2001 | Patterson et al. | 434/245 |
| 6,330,976 B1* | 12/2001 | Dymetman et al. | 235/487 |
| 6,331,865 B1* | 12/2001 | Sachs et al. | 715/776 |
| 6,331,867 B1* | 12/2001 | Eberhard et al. | 715/864 |
| 6,335,727 B1 | 1/2002 | Morishita et al. | |
| 6,349,194 B1 | 2/2002 | Nozaki et al. | |
| 6,363,239 B1* | 3/2002 | Tutt et al. | 434/317 |
| 6,388,681 B1 | 5/2002 | Nozaki | |
| 6,392,632 B1* | 5/2002 | Lee | 345/158 |
| 6,396,481 B1 | 5/2002 | Challa et al. | |
| 6,405,167 B1* | 6/2002 | Cogliano | 704/251 |
| 6,415,108 B1 | 7/2002 | Kamishima et al. | |
| 6,416,326 B1 | 7/2002 | Oh | |
| 6,418,326 B1 | 7/2002 | Heinonen et al. | |
| 6,421,524 B1* | 7/2002 | Padgett | 434/317 |
| 6,434,561 B1 | 8/2002 | Durst, Jr. et al. | |
| 6,441,807 B1 | 8/2002 | Yamaguchi | |
| 6,442,350 B1 | 8/2002 | Stephany et al. | |
| 6,456,749 B1* | 9/2002 | Kasabach et al. | 382/314 |
| 6,460,155 B1 | 10/2002 | Nagasaki et al. | |
| 6,473,072 B1 | 10/2002 | Comiskey et al. | |
| 6,476,834 B1* | 11/2002 | Doval et al. | 715/863 |
| 6,493,734 B1* | 12/2002 | Sachs et al. | 715/526 |
| 6,502,756 B1 | 1/2003 | Fahraeus | |
| 6,509,893 B1 | 1/2003 | Akhlagi et al. | |
| 6,516,181 B1* | 2/2003 | Kirwan | 434/317 |
| 6,532,314 B1 | 3/2003 | Plain et al. | |
| 6,535,799 B2 | 3/2003 | Levanoni et al. | 701/1 |
| 6,556,188 B1* | 4/2003 | Cordner | 345/173 |
| 6,564,249 B2 | 5/2003 | Shiigi | |
| 6,584,249 B1 | 6/2003 | Gu et al. | |
| 6,587,859 B2* | 7/2003 | Dougherty et al. | 707/104.1 |
| 6,609,653 B1 | 8/2003 | Lapstun et al. | |
| 6,628,847 B1* | 9/2003 | Kasabach et al. | 382/314 |
| 6,641,401 B2 | 11/2003 | Wood et al. | |
| 6,644,545 B1 | 11/2003 | Lapstun et al. | |
| 6,647,369 B1 | 11/2003 | Silverbrook et al. | |
| 6,651,879 B2 | 11/2003 | Lapstun et al. | |
| 6,661,405 B1 | 12/2003 | Flowers | |
| 6,663,008 B1 | 12/2003 | Pettersson et al. | |
| 6,665,490 B2 | 12/2003 | Copperman et al. | |
| 6,668,156 B2 | 12/2003 | Lynch et al. | |
| 6,676,411 B2* | 1/2004 | Rehkemper et al. | 434/85 |
| 6,678,499 B1 | 1/2004 | Silverbrook et al. | |
| 6,689,966 B2 | 2/2004 | Wiebe | |
| 6,724,373 B1* | 4/2004 | O'Neill, Jr. et al. | 345/179 |
| 6,724,374 B1 | 4/2004 | Lapstun et al. | |
| 6,738,050 B2 | 5/2004 | Comiskey et al. | |
| 6,738,053 B1 | 5/2004 | Borgstrom et al. | |
| 6,763,995 B1* | 7/2004 | Song | 235/375 |
| 6,771,283 B2* | 8/2004 | Carro | 715/702 |
| 6,798,403 B2 | 9/2004 | Kitada et al. | |
| 6,831,632 B2* | 12/2004 | Vardi | 345/179 |
| 6,847,883 B1 | 1/2005 | Walmsley et al. | |
| 6,874,883 B1 | 1/2005 | Shigemura et al. | |
| 6,885,878 B1* | 4/2005 | Borgstrom et al. | 455/556.1 |
| 6,886,036 B1* | 4/2005 | Santamaki et al. | 709/223 |
| 6,915,103 B2 | 7/2005 | Blume | |
| 6,933,928 B1* | 8/2005 | Lilienthal | 345/173 |
| 6,938,222 B2 | 8/2005 | Hullender et al. | |
| 6,940,491 B2* | 9/2005 | Incertis Carro | 345/173 |
| 6,943,670 B2* | 9/2005 | Liguori et al. | 340/321 |
| 6,947,027 B2 | 9/2005 | Lapstun et al. | |
| 6,956,562 B1 | 10/2005 | O'Hara et al. | |
| 6,956,564 B1* | 10/2005 | Williams | 345/179 |
| 6,965,454 B1 | 11/2005 | Silverbrook et al. | |
| 6,966,495 B2 | 11/2005 | Lynggaard et al. | |
| 6,966,777 B2* | 11/2005 | Robotham | 434/167 |
| 6,982,703 B2 | 1/2006 | Lapstun et al. | |
| 6,985,138 B2 | 1/2006 | Charlier | |
| 6,989,816 B1 | 1/2006 | Dougherty et al. | |
| 7,006,116 B1* | 2/2006 | Meyers et al. | 345/156 |
| 7,035,583 B2* | 4/2006 | Ferrigno et al. | 434/308 |
| 7,068,860 B2 | 6/2006 | Kasabach et al. | |
| 7,080,103 B2 | 7/2006 | Womack | |
| 7,099,019 B2 | 8/2006 | Silverbrook et al. | |
| 7,184,592 B2 | 2/2007 | Iga et al. | |
| 7,193,618 B2 | 3/2007 | Morehouse | |
| 7,202,861 B2 | 4/2007 | Lynggaard | |
| 7,239,306 B2 | 7/2007 | Fahraeus et al. | |
| 7,289,110 B2* | 10/2007 | Hansson | 345/173 |
| 7,295,193 B2 | 11/2007 | Fahraeus | |
| 7,349,586 B2* | 3/2008 | Kasabach et al. | 382/314 |
| 7,409,089 B2 | 8/2008 | Simmons et al. | |
| 6,239,792 B1 | 6/2010 | Yanagisawa et al. | |
| 2001/0015721 A1 | 8/2001 | Byun et al. | |
| 2001/0024193 A1 | 9/2001 | Fahraeus | |
| 2001/0051329 A1 | 12/2001 | Lynch et al. | |
| 2002/0000468 A1 | 1/2002 | Bansal | |
| 2002/0011989 A1 | 1/2002 | Ericson et al. | |
| 2002/0023957 A1 | 2/2002 | Michaelis et al. | |
| 2002/0029146 A1 | 3/2002 | Nir | |
| 2002/0044134 A1 | 4/2002 | Ericson et al. | |
| 2002/0077902 A1 | 6/2002 | Marcus | |
| 2002/0083101 A1* | 6/2002 | Card et al. | 707/526 |
| 2002/0087598 A1* | 7/2002 | Carro | 707/513 |
| 2002/0113802 A1* | 8/2002 | Card et al. | 345/619 |
| 2002/0113823 A1* | 8/2002 | Card et al. | 345/776 |
| 2002/0118230 A1* | 8/2002 | Card et al. | 345/776 |
| 2002/0193975 A1* | 12/2002 | Zimmerman | 703/6 |
| 2003/0001020 A1 | 1/2003 | Kardach | |
| 2003/0013073 A1 | 1/2003 | Duncan et al. | |
| 2003/0013483 A1 | 1/2003 | Ausems et al. | |
| 2003/0014615 A1* | 1/2003 | Lynggaard | 712/220 |
| 2003/0016210 A1 | 1/2003 | Soto et al. | |
| 2003/0016212 A1 | 1/2003 | Lynggaard | |
| 2003/0024975 A1 | 2/2003 | Rajasekharan | |
| 2003/0025951 A1* | 2/2003 | Pollard et al. | 358/505 |
| 2003/0028451 A1 | 2/2003 | Ananian | |
| 2003/0029919 A1* | 2/2003 | Lynggaard et al. | 235/472.03 |
| 2003/0046256 A1 | 3/2003 | Hugosson et al. | |
| 2003/0052900 A1* | 3/2003 | Card et al. | 345/660 |
| 2003/0067427 A1 | 4/2003 | Comiskey et al. | |
| 2003/0089777 A1 | 5/2003 | Rajasekharan et al. | |
| 2003/0090477 A1 | 5/2003 | Lapstun et al. | |
| 2003/0095098 A1 | 5/2003 | Paul et al. | |
| 2003/0112220 A1* | 6/2003 | Yang et al. | 345/156 |
| 2003/0134257 A1 | 7/2003 | Morsy et al. | |
| 2003/0162162 A1 | 8/2003 | Marggraff | |
| 2003/0195820 A1* | 10/2003 | Silverbrook et al. | 705/26 |
| 2003/0208410 A1 | 11/2003 | Silverbrook et al. | |
| 2004/0012198 A1 | 1/2004 | Brotzell et al. | |

| | | | |
|---|---|---|---|
| 2004/0022454 A1 | 2/2004 | Kasabach et al. | |
| 2004/0029092 A1 | 2/2004 | Orr et al. | |
| 2004/0039750 A1* | 2/2004 | Anderson et al. | 707/103 R |
| 2004/0043365 A1 | 3/2004 | Kelley et al. | |
| 2004/0043371 A1 | 3/2004 | Ernst et al. | |
| 2004/0084190 A1 | 5/2004 | Hill et al. | |
| 2004/0104890 A1* | 6/2004 | Caldwell et al. | 345/156 |
| 2004/0140966 A1 | 7/2004 | Marggraff et al. | |
| 2004/0164975 A1* | 8/2004 | Ho et al. | 345/204 |
| 2004/0167895 A1* | 8/2004 | Carro | 707/9 |
| 2004/0169695 A1 | 9/2004 | Forman | |
| 2004/0219501 A1 | 11/2004 | Small et al. | |
| 2004/0229195 A1 | 11/2004 | Marggraff et al. | |
| 2005/0005246 A1* | 1/2005 | Card et al. | 715/776 |
| 2005/0013487 A1 | 1/2005 | Clary et al. | |
| 2005/0022130 A1 | 1/2005 | Fabritius | |
| 2005/0055628 A1 | 3/2005 | Chen et al. | |
| 2005/0083316 A1 | 4/2005 | Brian et al. | |
| 2005/0131803 A1 | 6/2005 | Lapstun et al. | |
| 2005/0135678 A1 | 6/2005 | Wecker et al. | |
| 2005/0165663 A1 | 7/2005 | Razumov | |
| 2005/0188306 A1 | 8/2005 | Mackenzie | |
| 2005/0208458 A1 | 9/2005 | Smith et al. | |
| 2006/0067576 A1 | 3/2006 | Marggraff et al. | |
| 2006/0067577 A1 | 3/2006 | Marggraff et al. | |
| 2006/0080609 A1 | 4/2006 | Marggraff | |
| 2006/0125805 A1 | 6/2006 | Marggraff | |
| 2006/0127827 A1 | 6/2006 | Yoshida et al. | |
| 2006/0146029 A1 | 7/2006 | Diercks | |
| 2006/0168261 A1 | 7/2006 | Serval et al. | |
| 2006/0269168 A1 | 11/2006 | Kasabach et al. | |
| 2007/0003316 A1 | 1/2007 | Fujiwara | |

FOREIGN PATENT DOCUMENTS

| | | |
|---|---|---|
| CN | 1655184 | 8/2005 |
| EP | 200495618 A2 | 7/1992 |
| EP | 539053 | 4/1993 |
| EP | 0866397 | 9/1998 |
| EP | 1256091 | 4/2004 |
| EP | 1416426 | 5/2004 |
| EP | 1315085 | 5/2005 |
| FR | 2811130 | 1/2002 |
| GB | 2202664 | 9/1988 |
| JP | 57-238486 | 3/1982 |
| JP | 61-46516 | 3/1986 |
| JP | 5-137846 | 6/1993 |
| JP | 5-217688 | 8/1993 |
| JP | 7296387 | 11/1995 |
| JP | 9245828 | 9/1997 |
| JP | 2002297308 | 10/2002 |
| JP | 2003528402 | 9/2003 |
| KR | 2002009615 | 11/2000 |
| KR | 20020033775 | 5/2002 |
| WO | 99/57648 | 5/1999 |
| WO | 9957648 | 11/1999 |
| WO | 0031682 | 6/2000 |
| WO | 0072242 | 11/2000 |
| WO | WO 00/73983 A1 | 12/2000 |
| WO | WO 01/01670 A1 | 1/2001 |
| WO | WO 01/16691 A1 | 3/2001 |
| WO | WO 01/26032 A1 | 4/2001 |
| WO | 0161455 A1 | 8/2001 |
| WO | 0171653 A1 | 9/2001 |
| WO | WO 01/71473 A1 | 9/2001 |
| WO | WO 01/71475 A1 | 9/2001 |
| WO | WO 01/75723 A1 | 10/2001 |
| WO | WO 01/75773 A1 | 10/2001 |
| WO | WO 01/75780 A1 | 10/2001 |
| WO | 0183213 | 11/2001 |
| WO | 0186612 A1 | 11/2001 |
| WO | WO 01/95559 A1 | 12/2001 |
| WO | 0242894 A1 | 5/2002 |
| WO | 03001357 | 1/2003 |
| WO | 03/067553 | 8/2003 |
| WO | 03/083763 | 10/2003 |
| WO | 2004/084190 | 9/2004 |
| WO | 2004084190 | 11/2004 |

OTHER PUBLICATIONS

Robertson G.G. et al:, "Buttons as First Class Objects on an X Desktop", Nov. 11, 1991, UIST '91. 4th Annual Symposium on user interface software and technology. Proceedings of the ACM Symposium on user interface software and technology. Hilton Head, SC, Nov. 11-13, 1991, ACM symposium on user interface software and technology, New Yo, pp. 35-44, XP000315064.

"The Questron Electronic Wand", 2 pages; Prce, Stern, Sloan Publishers, Inc. Los Angeles, retrieved 2008.

English Translation of Patent Abstract for JP7-296387 [Retrieved Feb. 27, 2008] Retrieved Online from {Japanese} National Center for Industrial Property Information and Training's Industrial Property Digital Library (IPDL> <URL:http://www.inipit.go.jp/PA1/result/detail/main/wAAAkaa44DA407296387P1.htm>.

Stifelman, Lisa J. Augmenting Real-World Objects: A Paper-based Audio Notebook. 1993. Speech Research Group. MIT Media Laboratory, Cambridge MA.

The Tools of Progress. [Retrieved Jun. 19, 2001] [Retrieved from the Internet] <URL:http://www.anoto.com/print_page.asp?cid=22>.

Web Page; "Scan-A-Page or Word Lets Students Hear What They're Attempting to Read!;" at URL=http://www.brighteye.com/home.htm; printed Mar. 13, 2003; 1 page.

Web Page; "What Works: Optical Scanner Pens;" URL=http://newsletters.fen.com/whatworks/items/front/0,2551,1-13751-3366-3,00.html; printed Mar. 13, 2003; 2 pages.

Steve Silberman, "The Hot New Medium: Paper", Apr. 2001, Wired, Issue 9.04.

Web page; "What Works; Optical Scanner Pens;" at URL=http://newsletters.fen.com/whatworks/item/ front/0,2551,1-13751-3363,00.html; printed Mar. 13, 2003; 2 pages (124DIVCON2).

"The Questron Electronic Wand;" 2 pages; Price, Stern, Sloan Publishers, Inc., Los Angeles (124DIVCON2) - 1987 ISBN 0-8431-3262-0.

British Micro, "Operating Guide to Grafpad", 1982, 28 pp.

Kramer, Translucent Patches-Dissolving Windows;, Nov. 2, 1994 Symposium on user interface software and technology, pp. 121-130, XP00197943 (12DIVCON2).

Robertson G.G et al;, "Buttons As First Class Objects On An X Desktop", Nov. 11, 1991, UIST '91.4th Annual Symposium on user interface software and technology. Proceedings of the ACM Symposium on user interface and technology. Hilton Head, SC, Nov. 11-13, 1991, ACM symposium on user interface software and technology, New Yo, pp. 35-44, XP000315064 (12DIVCON2).

Stifelman, Lisa J. Augmenting Real-World Objects; A Paper-Based Audio Notebook. 1993. Speech Research Group, MIT Media Laboratory, Cambridge MA. (12DIVCON2).

The Tools of Progress. [Retrieved Jun. 19, 2001] [Retrieved from the Internet] <URL:http://www.anoto.com/print_page.asp?cid=22> (12DIVCON2).

"New Preschool Toys From Fisher-Price Give a Voice to Fun, Creativity and Interactive Play This Holiday Season", Mattel, Inc.: Investor Relations, http://www.shareholder.com/mattel/news/20000601-43282.cfm, 3pp.

Web Page; "Scan-A-Page or Word Lets Students Hear What They're Attempting to Read!;" at URL=http://www.brighteye.com/home.htm; printed Mar. 13, 2003; 1 page.

* cited by examiner

METHOD AND SYSTEM FOR IMPLEMENTING A USER INTERFACE FOR A DEVICE EMPLOYING WRITTEN GRAPHICAL ELEMENTS

CROSS REFERENCES TO RELATED APPLICATIONS

This application is a Continuation-in-Part of the co-pending, commonly-owned U.S. patent application, Ser. No. 10/803,806, filed Mar. 17, 2004, by James Marggraff et al., entitled "Scanning Apparatus," and hereby incorporated by reference in its entirety.

This application is a Continuation-in-Part of the co-pending, commonly-owned U.S. patent application, Ser. No. 10/861,243, filed Jun. 3, 2004, by James Marggraff et al., entitled "User Created Interactive Interface," and hereby incorporated by reference in its entirety.

This Application is related to U.S. patent application "TERMINATION EVENTS", by Marggraff et al., filed on Jan. 12, 2005, that is incorporated herein in its entirety.

This Application is related to U.S. patent application "PROVIDING A USER INTERFACE HAVING INTERACTIVE ELEMENTS ON A WRITABLE SURFACE", by Marggraff et al., filed on Jan. 12, 2005, that is incorporated herein in its entirety.

TECHNICAL FIELD

Embodiments of the invention relate to the control and use of interactive devices, computers, electronic devices, appliances, toys, and the like.

BACKGROUND ART

Devices such as optical readers or optical pens conventionally emit light that reflects off a surface to a detector or imager. As the device is moved relative to the surface (or vice versa), successive images are rapidly captured. By analyzing the images, movement of the optical device relative to the surface can be tracked.

One type of optical pen is used with a sheet of paper on which very small dots are printed. The dots are printed on the page in a pattern with a nominal spacing of about 0.3 millimeters (0.01 inches). The pattern of dots within any region on the page is unique to that region. The optical pen essentially takes a snapshot of the surface, perhaps 100 times a second or more. By interpreting the dot positions captured in each snapshot, the optical pen can precisely determine its position relative to the page.

Applications that utilize information about the position of an optical pen relative to a surface have been or are being devised. An optical pen with Bluetooth or other wireless capability can be linked to other devices and used for sending electronic mail (e-mail) or faxes.

The increasing power of embedded computer systems and the complexity of the functions they are able to implement have created a need for a more intuitive and user-friendly manner of accessing such power. A typical prior art optical pen will implement its intended functionality by the user operating one or more buttons/switches or controls of the optical pen to activate one or more software programs, routines, embedded devices, or the like. The pen may contain or be in communication with a computer system. Upon actuation of such controls, the pen device performs its intended function. Accessing the capabilities of increasingly powerful optical pens through the limited number and configuration of switches, buttons, etc. provided on the pen itself, or any remotely coupled computer system device, is not a satisfactory arrangement.

One prior art solution uses the optical pen to recognize a user-defined command, and uses that command to invoke some function of the pen (e.g., PCT publication WO/01/48590 A1). For example, a user's writing can be recognized (e.g., in real-time) and interpreted as a command for the optical pen. The drawback with this solution involves the fact that interaction and control of the functions of the pen requires real-time recognition of the user's handwriting (e.g., as the user writes the command down on a sheet of paper). This solution is not satisfactory due to the fact that interaction with more complex functionality of an optical pen requires the user to repeatedly write-down one or more commands to access different choices, options, or functions provided by the pen. While the solution might be satisfactory for exceedingly simple, single step type applications (e.g., "turn off", "store", etc.), the solution is overly cumbersome and limiting in those cases where more complex, satisfying, rich functionality is desired.

DISCLOSURE OF THE INVENTION

Accordingly, a user interface method and system that enables interaction with more complex functionality of an optical pen device having a computer system associated therewith and enables more efficient access to the different choices, options, and functions provided by the pen device, would be valuable. What is further desired is a method and interactive interface useful for interacting with an operating system resident on, or in communication with, a pen device. Embodiments in accordance with the present invention provide these and other advantages.

In one embodiment, the present invention is implemented as a method for implementing a user interface for a device employing user created or written graphical elements and/or printed graphical elements that are on a surface. The method includes recognizing a created graphical element icon (e.g., created by a user) on a surface. Once recognized, a function related to the graphical element icon is accessed and an output in accordance with the function is provided. The functionality may reside on the pen device and the written graphical element may be written using the pen device. The graphical element icon can be a symbol, character, or mark created on the surface by the user, that is recognized as such by interpreting functionality (e.g., optical sensors, embedded computer system, etc.) of the device. The output is typically an audio output provided via an audio output device (e.g., a speaker coupled to, or resident on, the device). The function is persistently associated with the graphical element icon, enabling a subsequent access of the function (e.g., at some later time) by a subsequent actuation (e.g., tapping) of the graphical element icon by the pen device.

In one embodiment, the selection of a written or printed graphical element icon causes the pen device to audibly render a list of further selections that may be written and selected by the user. In this case, the first graphic element icon functions as a menu item that when selected causes the pen device to render sub-menu items related to the first graphic element icon. Any, or all, of the sub-menu items may be written on the surface and themselves selected, thereby causing the pen device to perform related functionality.

These and other objects and advantages of the present invention will be recognized by one skilled in the art after having read the following detailed description, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE EMBODIMENTS

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "computing," "configuring," "generating," or the like, refer to the action and processes of a microcontroller, computer system, or similar electronic computing device, that manipulates and transforms data represented as physical (electronic) quantities within registers and memories into other data similarly represented as physical quantities.

EMBODIMENTS OF THE INVENTION

Figure 1:
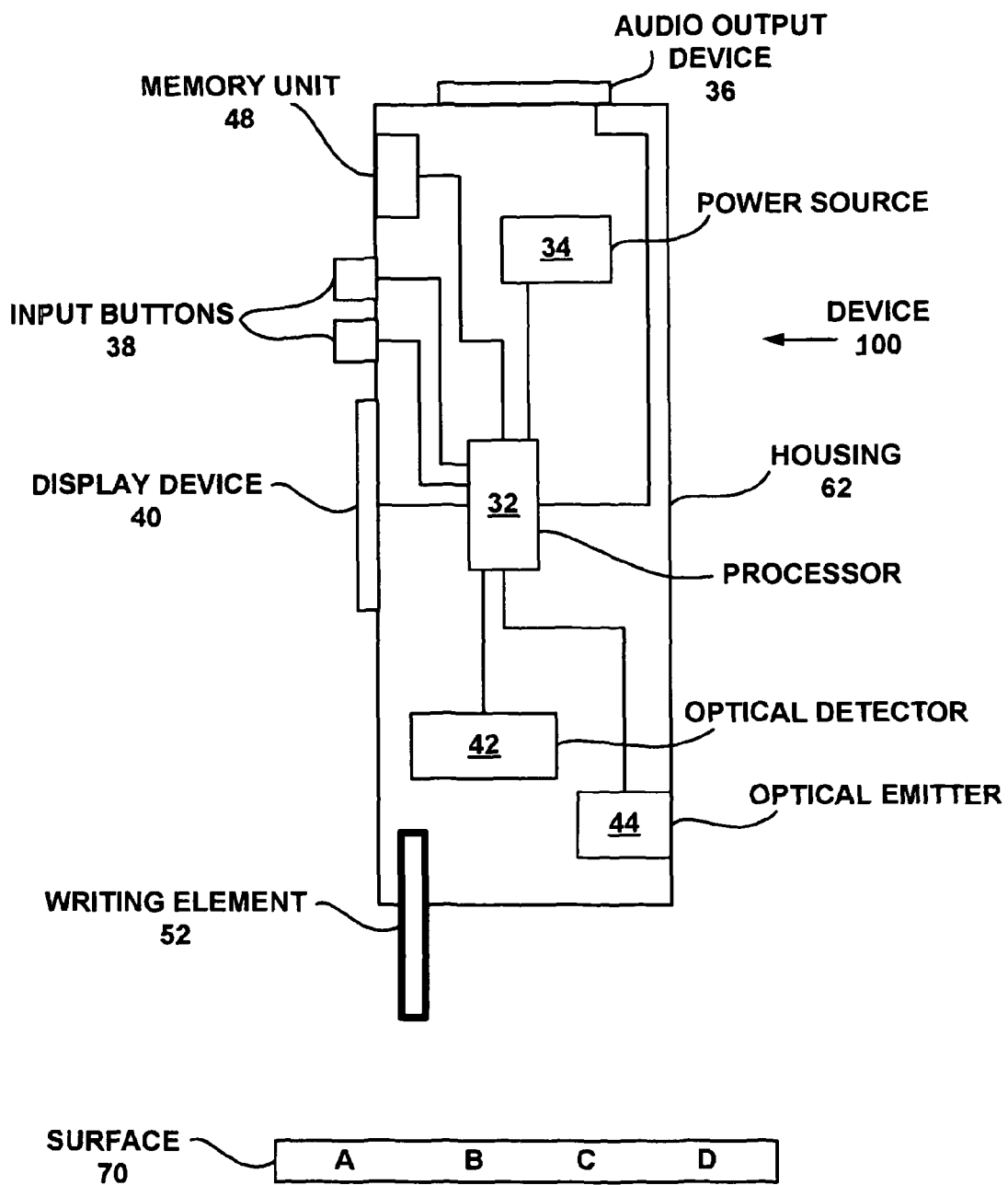
FIG. 1 is a block diagram of a device upon which embodiments of the present invention can be implemented.

FIG. 1 is a block diagram of a pen device 100 upon which embodiments of the present invention can be implemented. In general, pen device 100 may be referred to as an optical device, more specifically as an optical reader, optical pen or digital pen. The device may contain a computer system and an operating system resident thereon. Application programs may also reside thereon.

In the embodiment of FIG. 1, pen device 100 includes a processor 32 inside a housing 62. In one embodiment, housing 62 has the form of a pen or other writing or marking utensil or instrument. Processor 32 is operable for processing information and instructions used to implement the functions of pen pen device 100, which are described below.

In the present embodiment, the pen device 100 may include an audio output device 36 and a display device 40 coupled to the processor 32. In other embodiments, the audio output device and/or the display device are physically separated from pen device 100, but in communication with pen device 100 through either a wired or wireless connection. For wireless communication, pen device 100 can include a transceiver or transmitter (not shown in FIG. 1). The audio output device 36 may include a speaker or an audio jack (e.g., for an earphone or headphone). The display device 40 may be a liquid crystal display (LCD) or some other suitable type of display.

In the embodiment of FIG. 1, pen device 100 may include input buttons 38 coupled to the processor 32 for activating and controlling the pen device 100. For example, the input buttons 38 allow a user to input information and commands to pen device 100 or to turn pen device 100 on or off. Pen device 100 also includes a power source 34 such as a battery.

Pen device 100 also includes a light source or optical emitter 44 and a light sensor or optical detector 42 coupled to the processor 32. The optical emitter 44 may be a light emitting diode (LED), for example, and the optical detector 42 may be a charge coupled device (CCD) or complementary metal-oxide semiconductor (CMOS) imager array, for example. The optical emitter 44 illuminates surface 70 or a portion thereof. Light reflected from the surface 70 is received at and recorded by optical detector 42.

The surface 70 may be a sheet a paper, although the present invention is not so limited. For example, the surface 70 may comprise an LCD (liquid crystal display, CRT (cathode ray tube), touch screen, a surface comprising electronic ink, reconfigurable paper, or other types of electronically active surfaces (e.g., the display of a laptop or tablet PC).

In one embodiment, a pattern of markings is printed on surface 70. The end of pen device 100 that holds optical emitter 44 and optical detector 42 is placed against or near surface 70. As pen device 100 is moved relative to the surface 70, the pattern of markings are read and recorded by optical emitter 44 and optical detector 42. As discussed in more detail further below, in one embodiment, the markings on surface 70 are used to determine the position of pen device 100 relative to surface (see FIGS. 3 and 4). In another embodiment, the markings on surface 70 are used to encode information (see FIGS. 5 and 6). The captured images of surface 70 can be analyzed (processed) by pen device 100 to decode the markings and recover the encoded information.

Additional descriptions regarding surface markings for encoding information and the reading/recording of such markings by electronic devices can be found in the following patents and patent applications that are assigned to Anoto and that are all herein incorporated by reference in their entirety: U.S. Pat. No. 6502,756, U.S. application Ser. No. 10/179,966, filed on Jun. 26, 2002, WO 01/95559, WO 01/71473, WO 01/75723, WO 01/26032, WO 01/75780, WO 01/01670, WO 01/75773, WO 01/71475, WO 10 00/73983, and WO 01116691.

Pen device 100 of FIG. 1 also includes a memory unit 48 coupled to the processor 32. In one embodiment, memory unit 48 is a removable memory unit embodied as a memory cartridge or a memory card. In another embodiment, memory unit 48 includes random access (volatile) memory (RAM) and read-only (non-volatile) memory (ROM) for storing information and instructions for processor 32.

In the embodiment of FIG. 1, pen device 100 includes a writing element 52 situated at the same end of pen device 100 as the optical detector 42 and the optical emitter 44. Writing element 52 can be, for example, a pen, pencil, marker or the like, and may or may not be retractable. In certain applications, writing element 52 is not needed. In other applications, a user can use writing element 52 to make marks (e.g., graphical elements) on surface 70, including characters such as letters, words, numbers, mathematical symbols and the like. These marks can be scanned (imaged) and interpreted by pen device 100 according to their position on the surface 70. The position of the user-produced marks can be determined using a pattern of marks that are printed on surface 70; refer to the discussion of FIGS. 3 and 4, below. In one embodiment, the user-produced markings can be interpreted by pen device 100 using optical character recognition (OCR) techniques that recognize handwritten characters.

As mentioned above, surface 70 may be any surface suitable on which to write, such as, for example, a sheet of paper, although surfaces consisting of materials other than paper may be used. Also, surface 70 may or may not be flat. For example, surface 70 may be embodied as the surface of a globe. Furthermore, surface 70 may be smaller or larger than a conventional (e.g., 8.5×11 inch) page of paper.

Figure 2:
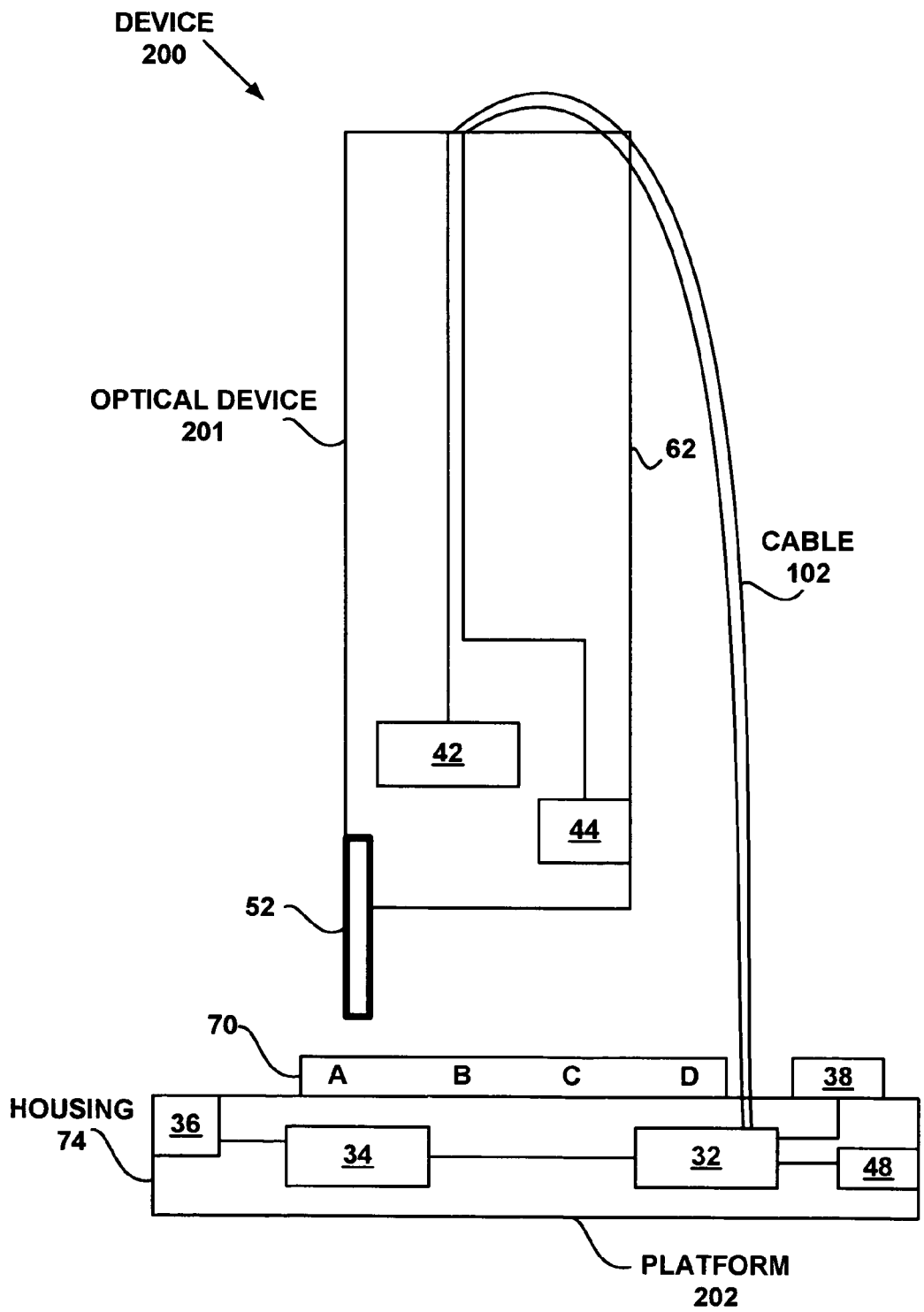
FIG. 2 is a block diagram of another device upon which embodiments of the present invention can be implemented.

FIG. 2 is a block diagram of another device 200 upon which embodiments of the present invention can be implemented. Device 200 includes processor 32, power source 34, audio output device 36, input buttons 38, memory unit 48, optical detector 42, optical emitter 44 and writing element 52, previously described herein. However, in the embodiment of FIG. 2, optical detector 42, optical emitter 44 and writing element 52 are embodied as optical device 201 in housing 62, and processor 32, power source 34, audio output device 36, input buttons 38 and memory unit 48 are embodied as platform 202 in housing 74. In the present embodiment, optical device 201 is coupled to platform 202 by a cable 102; however, a wireless connection can be used instead. The elements illustrated by FIG. 2 can be distributed between optical device 201 and platform 200 in combinations other than those described above.

Figure 3:
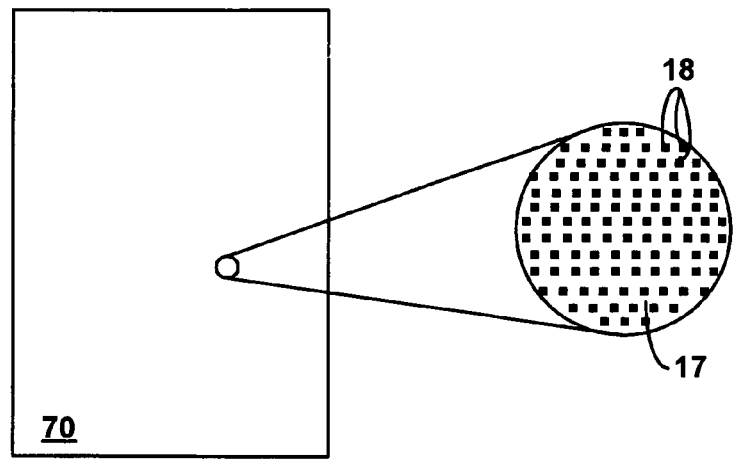
FIG. 3 shows an exemplary sheet of paper provided with a pattern of marks according to one embodiment of the present invention.

FIG. 3 shows a sheet of paper 15 provided with a pattern of marks according to one embodiment of the present invention. In the embodiment of FIG. 3, sheet of paper 15 is provided with a coding pattern in the form of optically readable position code 17 that consists of a pattern of marks 18. The marks 18 in FIG. 3 are greatly enlarged for the sake of clarity. In actuality, the marks 18 may not be easily discernible by the human visual system, and may appear as grayscale on sheet of paper 15. In one embodiment, the marks 18 are embodied as dots; however, the present invention is not so limited.

Figure 4:
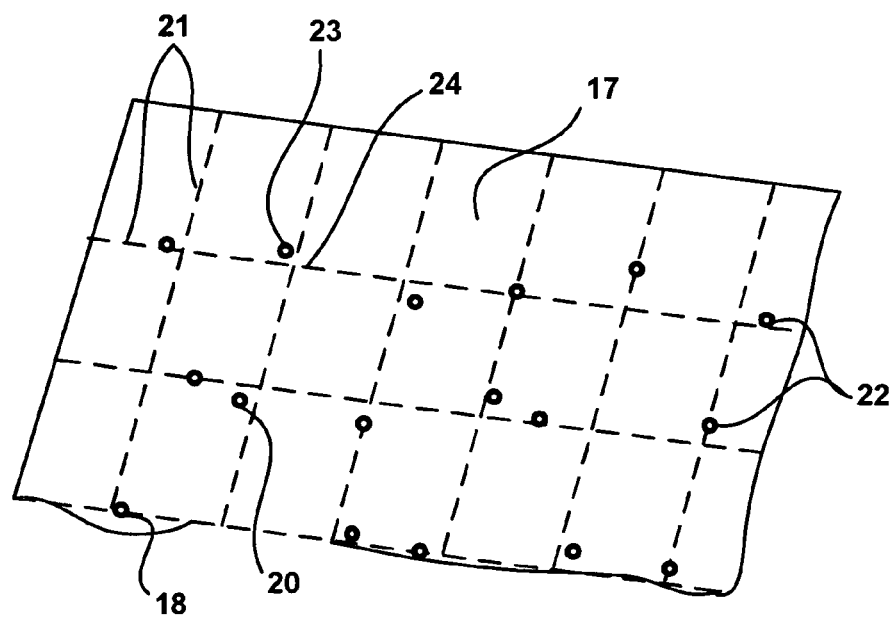
FIG. 4 shows an enlargement of a pattern of marks on an exemplary sheet of paper according to one embodiment of the present invention.

FIG. 4 shows an enlarged portion 19 of the position code 17 of FIG. 3. An optical device such as devices 100 and 200 (FIGS. 1 and 2) is positioned to record an image of a region of the position code 17. In one embodiment, the optical device fits the marks 18 to a reference system in the form of a raster with raster lines 21 that intersect at raster points 22. Each of the marks 18 is associated with a raster point 22. For example, mark 23 is associated with raster point 24. For the marks in an image/raster, the displacement of a mark from the raster point associated with the mark is determined. Using these displacements, the pattern in the image/raster is compared to patterns in the reference system. Each pattern in the reference system is associated with a particular location on the surface 70. Thus, by matching the pattern in the image/raster with a pattern in the reference system, the position of the pattern on the surface 70, and hence the position of the optical device relative to the surface 70, can be determined.

Additional descriptions regarding surface markings for encoding information and the reading/recording of such markings by electronic devices can be found in the following patents and patent applications that are assigned to Anoto and that are all herein incorporated by reference in their entirety: U.S. Pat. No. 6,502,756, U.S. application Ser. No. 10/179, 966, filed on Jun. 26, 2002, WO 01/95559, WO 01/71473, WO 01/75723, WO 01/26032, WO 01/75780, WO 01/01670, WO 01/75773, WO 01/71475, WO 10 00/73983, and WO 01/16691.

With reference back to FIG. 1, four positions or regions on surface 70 are indicated by the letters A, B, C and D (these characters are not printed on surface 70, but are used herein to indicate positions on surface 70). There may be many such regions on the surface 70. Associated with each region on surface 70 is a unique pattern of marks. The regions on surface 70 may overlap because even if some marks are shared between overlapping regions, the pattern of marks in a region is still unique to that region.

In the example of FIG. 1, using pen device 100 (specifically, using writing element 52), a user may create a character consisting, for example, of a circled letter "M" at position A on surface 70 (generally, the user may create the character at any position on surface 70). The user may create such a character in response to a prompt (e.g., an audible prompt) from pen device 100. When the user creates the character, pen device 100 records the pattern of markings that are uniquely present at the position where the character is created. The pen device 100 associates that pattern of markings with the character just created. When pen device 100 is subsequently positioned over the circled "M," pen device 100 recognizes the pattern of marks associated therewith and recognizes the position as being associated with a circled "M." In effect, pen device 100 recognizes the character using the pattern of markings at the position where the character is located, rather than by recognizing the character itself.

In one embodiment, the characters described above comprise "graphic elements" that are associated with one or more commands of the pen device 100. It should be noted that such graphic elements that are associated with, and are used to access the pen device 100 implemented functions comprising commands, are referred to as "graphic element icons" hereafter in order to distinguish from other written characters, marks, etc. that are not associated with accessing functions or applications of the pen device 100. In the example just described, a user can create (write) a graphic element icon that identifies a particular command, and can invoke that command repeatedly by simply positioning pen device 100 over the graphic element icon (e.g., the written character). In one embodiment, the writing instrument is positioned over the graphical character. In other words, the user does not have to write the character for a command each time the command is to be invoked by the pen device 100; instead, the user can write the graphic element icon for a command one time and invoke the command repeatedly using the same written graphic element icon. This attribute is referred to as "persistence" and is described in greater detail below. This is also true regarding graphical element icons that are not user written but pre-printed on the surface and are nevertheless selectable by the pen device 100.

In one embodiment, the graphic element icons can include a letter or number with a line circumscribing the letter or number. The line circumscribing the letter or number may be a circle, oval, square, polygon, etc. Such graphic elements appear to be like "buttons" that can be selected by the user, instead of ordinary letters and numbers. By creating a graphic element icon of this kind, the user can visually distinguish graphic element icons such as functional icons from ordinary letters and numbers, which may be treated as data by the pen device 100. Also, by creating graphic element icons of this kind, the pen device may also be able to better distinguish functional or menu item type graphic elements from non-functional or non-menu item type graphic elements. For instance, a user may create a graphic element icon that is the letter "M" which is enclosed by a circle to create an interactive "menu" graphic element icon.

The pen device 100 may be programmed to recognize an overlapping circle or square with the letter "M" in it as a functional graphic element as distinguished from the letter "M" in a word. The graphic element icon may also include a small "check mark" symbol adjacent thereto, within a certain distance (e.g., 1 inch, 1.5 inches, etc.). The checkmark will be associated with the graphic element icon. Computer code for recognizing such functional graphic elements and distinguishing them from other non-functional graphic elements can reside in the memory unit in the pen device. The processor can recognize the graphic element icons and can identify the locations of those graphic element icons so that the pen device 100 can perform various functions, operations, and the like associated therewith. In these embodiments, the memory unit may comprise computer code for correlating any graphic elements produced by the user with their locations on the surface. The pen device 100 recognizes a "down-touch" or "down-stroke" or being placed down upon the surface (e.g., when the user begins writing) and recognizes an "up-stroke" or being picked up from the surface (e.g., when the user finishes writing). Such down-strokes and up-strokes can be interpreted by the pen device 100 as, for example, indicators as to when certain functionality is invoked and what particular function/application is invoked (e.g., triggering OCR processing). Particularly, a down-stroke quickly followed by an up-stroke (e.g., a tap of the pen device on the surface) can be associated with a special action depending upon the application (e.g., selecting a graphic element icon, text string, etc.).

It should be noted that the generic term "graphic element" may include any suitable marking created by the user, and is distinguishable from a graphic element icon which refers to a functional graphic element that is used to access one or more functions of the device.

As mentioned above, it should be noted that graphic element icons can be created by the pen device 100 (e.g., drawn by the user) or can be pre-existing (e.g., a printed element on a sheet of paper). Example graphic elements include, but are not limited to symbols, indicia such as letters and/or numbers, characters, words, shapes, lines, etc. They can be regular or irregular in shape. User written/created graphic elements are typically created using the pen device 100. Additionally, graphic element icons usually, but not always, incorporate a circumscribing line (e.g., circle) around a character (e.g., the letter "M") to give them an added degree of distinctiveness to both the user and the pen device 100. For example, in one embodiment, an up-stroke after finishing a circle around the character can specifically indicate to the pen device 100 that the user has just created a graphic element icon.

Figure 5:
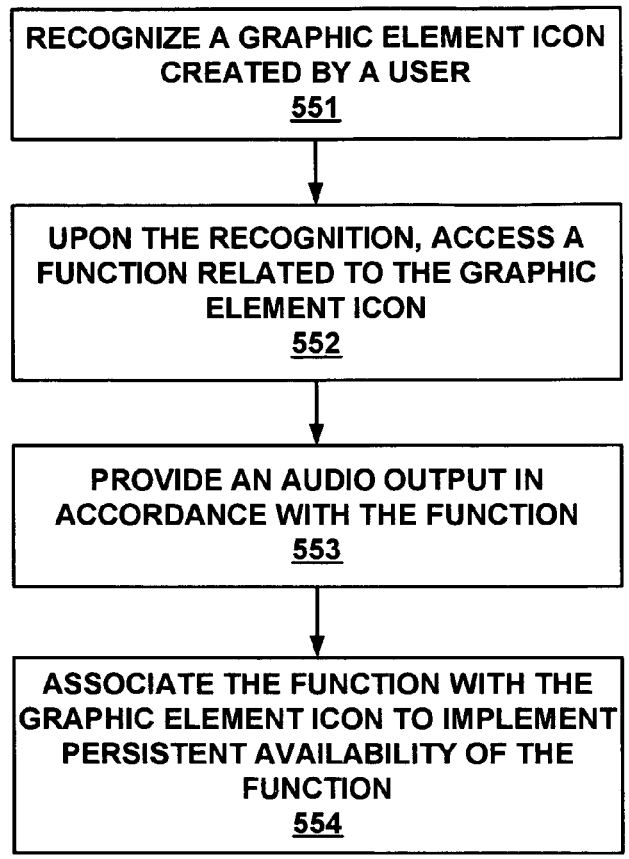
FIG. 5 shows a computer-controlled flowchart of the steps of a device user interface process in accordance with one embodiment of the present invention.

FIG. 5 shows a flowchart of the steps of a computer implement process 550 in accordance with one embodiment of the present invention. Process 550 depicts the basic operating steps of a user interface process as implemented by a device (e.g., pen device 100) in accordance with one embodiment of the present invention as it interprets user input in the form of graphic elements, writing, marks, etc. and provides the requested functionality to the user.

Process 550 begins in step 551, where the computer implemented functionality of the pen device 100 recognizes a created graphical element icon (e.g., created by a user). Alternatively, the graphic element may be preprinted on the surface and its location known to the pen device 100. At step 551, if the user is writing the graphic element for the first time, the pen device 100 is using the optical sensor and the processor to perform OCR (optical character recognition) on the writing to identify the user written graphical element. Its unique location on the surface is then also recorded, in one embodiment. In step 552, once recognized, a function related to the graphical element icon is accessed. This function can be, for example, a menu function that can enunciate (e.g., audibly render) a predetermined list of functions (e.g., menu choices or sub-menu options) for subsequent activation by the user. In step 553, an audio output in accordance with the function is provided. This audio output can be, for example, the enunciation of what particular choice the user is at within the list of choices. In step 554, the function is persistently associated with the graphical element icon, enabling a subsequent access of the function (e.g., at some later time) by a subsequent actuation (e.g., tapping with the pen device 100) of the graphical element icon. For example, in the case of a menu function, the listed menu choices can be subsequently accessed by the user at some later time by simply actuating the menu graphic element icon (e.g., tapping it).

It should be noted that the output of the pen device 100 can be visual output (e.g., via a display, indicator lights, etc.) in addition to, or instead of, audio output. The visual output and/or audio output can come directly from the pen device 100, or can be from another device (e.g., personal computer, speaker, LCD display, etc.) communicatively coupled to the pen device 100.

It is appreciated that a plurality of different graphic elements may exist on the surface and anytime, and the selection thereof may provide various functions to be executed by the pen device 100, for example, to invoked applications, invoke sub-menu options, etc.

In this manner, embodiments of the present invention implement a user interface means for navigating the functionality of a computer system, particularly the pen based computer system comprising, for example, the pen device 100. The user interface as implemented by the graphical element icons provides the method of interacting with a number of software applications that execute within the pen device 100. As described above, output from the pen device 100 may include audio output, and thus, the user interface means enables the user to carry on a "dialog" with the applications and functionality of the pen device 100. In other words, the user interface enables the user to create mutually recognized items such as graphic element icons that allow the user and the pen device 100 to interact with one another. As described above, the mutually recognized items are typically symbols or marks or icons that the user draws on a surface, typically a sheet of paper.

Different graphic element icons have different meaning and different manners of interaction with the user. Generally, for a given graphic element icon, the manner of interaction will call up different computer implemented functionality of the pen device. For illustration purposes, in the case of the menu example above, the menu functionality allows the user to iterate through a list of functions that are related to the graphic element (e.g., the number of taps on the menu graphic element icon iterates through a list of functions). Audio from the pen device can enunciate the function or mode as the taps are done. One of the enunciated functions/modes can then be selected by the user through some further interaction (e.g., drawing or selecting a previously drawn checkmark graphic element associated with the graphic element icon). Once selected, the functionality and options and further sub-menus of the particular selected function can then be accessed by the user. Alternatively, if one of the audibly rendered sub-options is itself a menu graphical icon, it can be selected by the user drawing its representation on the surface and selecting it.

Figure 6:
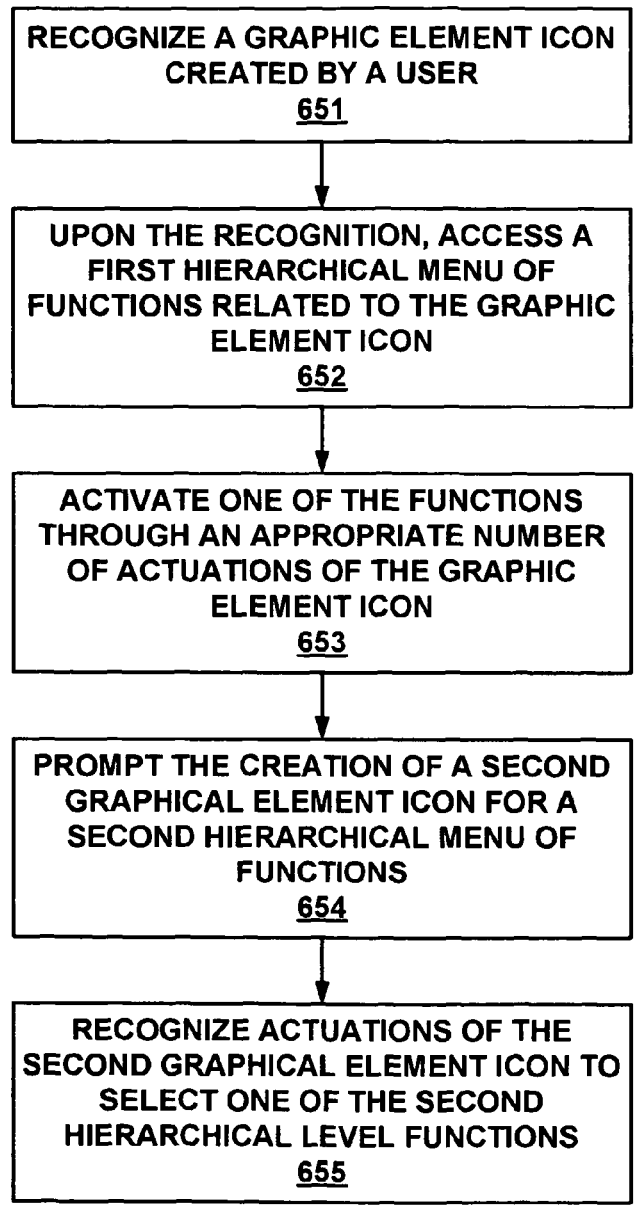
FIG. 6 shows a computer-controlled flowchart of the steps of a hierarchical device user interface process in accordance with one embodiment of the present invention.

FIG. 6 shows a flowchart of the computer implemented steps of a process 650 in accordance with one embodiment of the present invention. Process 650 depicts the basic operating steps of a user interface process for accessing (e.g., navigating through) a number of nested, hierarchical functions of an interactive device (e.g., pen device 100) in accordance with one embodiment of the present invention. Process 650 is described with reference to FIGS. 8A, 8B, and 8C.

Figure 8A:
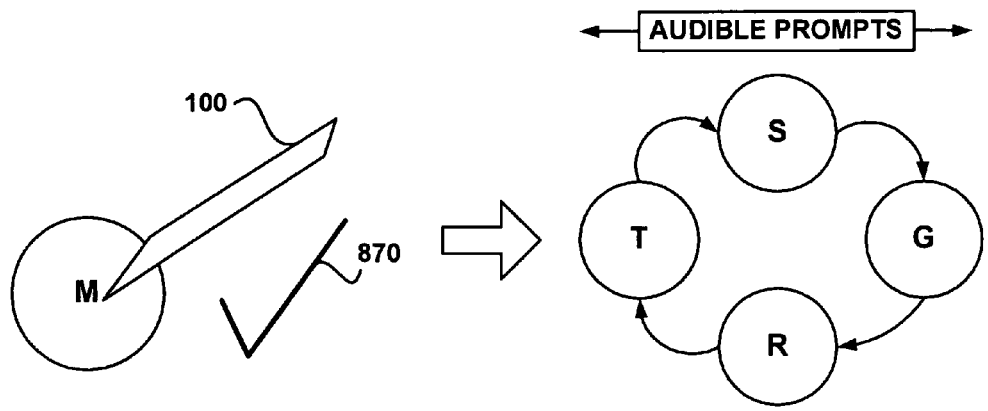
FIG. 8A shows a menu item audible prompting process in accordance with one embodiment of the present invention.

Process 650 begins in step 651, where the computer implemented functionality of the pen device 100 recognizes a created graphic element icon, shown in FIG. 8A as a menu icon "M". Like step 551, the graphic element icon may be written by the user or preprinted on the surface. In one case, the graphic element icon can provide a list of choices of further graphic element icons (e.g., hierarchical arrangement) that are associated their with and which themselves may provide further choices. In step 652, and as shown in FIG. 8A, once recognized, a first hierarchical menu of functions related to the graphic element icon is accessed. In this example, once recognized, the menu icon "M" of step 651 causes a list of sub-options (e.g., system "S", games "G", reference "R", and tools "T") to be audibly rendered (e.g., via audible prompts), one option at a time, as shown in FIG. 8A. The options are rendered in response to successive selections of the menu icon of step 651 by the pen device (e.g., pen device 100).

Figure 8B:
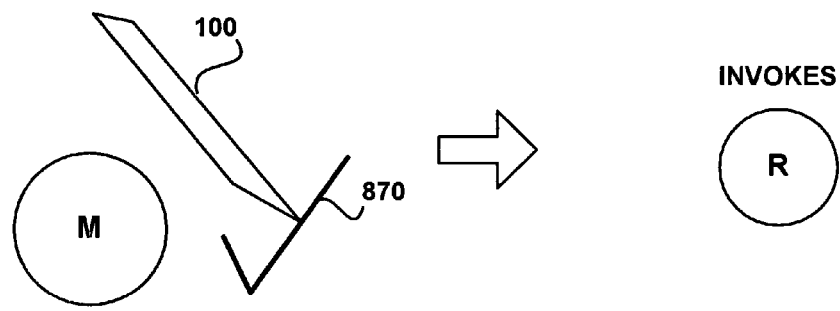
FIG. 8B shows a menu item selection process in accordance with one embodiment of the present invention.
Figure 8C:
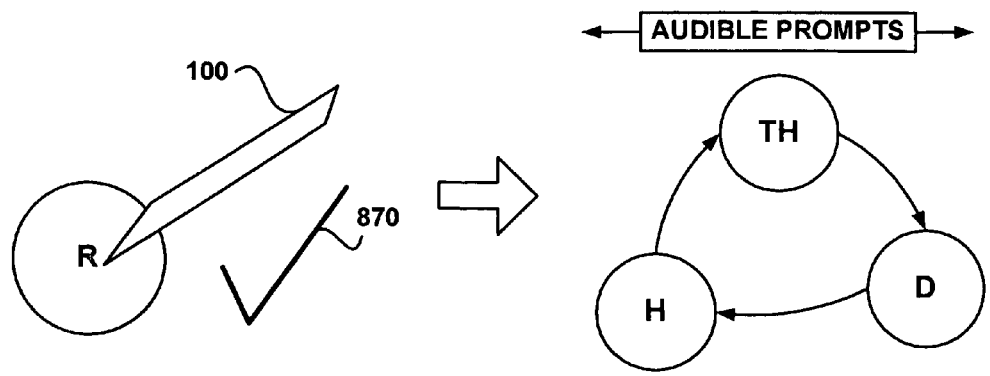
FIG. 8C shows a sub-menu items selection process in accordance with one embodiment of the present invention.

In step 653, and as illustrated in FIG. 8B, one of the enunciated functions, in this example, the reference graphic element icon "R", is selected through an appropriate number of actuations of the menu graphic element icon (e.g., taps) and an actuation the associated checkmark icon 870. In step 654, the activated function may prompt the creation of a second graphic element icon for a second hierarchical menu of functions. The second graphic element icon, the reference icon "R" in this example, may then be drawn on the surface by the user. The selection thereof, as shown in FIG. 8C, will cause a second listing of submenu items to be audibly rendered (e.g., via audible prompts) in the manner described above (e.g., Thesaurus "TH", dictionary "D", and help "H"). Subsequently in step 655, one of the enunciated functions of the second graphic element icon is activated through an appropriate number of actuations to select one of the second hierarchical level functions.

In this manner, one menu can invoke a number of sub-menus which themselves have even further sub-menus. Thus, different levels of graphic element icons can be hierarchically arranged. Generally, top-level graphic element icons which present menus of functions are referred to as group graphic element icons. Application graphic element icons are second-level graphic element icons that generally present menus of configuration options or application settings for a given application. For example, application graphic element icons can be considered as a special case of a group graphic element icon. Generally, an application graphic element icon has a specialized application related default behavior associated with it.

In this manner, the user may then select a menu item from the list of menu items. The menu items may include directory names, subdirectory names, application names, or names of specific data sets. Examples of directory or subdirectory names include, but are not limited to, "tools" (e.g., for interactive useful functions applicable under many different circumstances), "reference" (e.g., for reference materials such as dictionaries), "games" (e.g., for different games), etc. Examples of specific application (or subdirectory) names include "calculator", "spell checker", and "translator". Specific examples of data sets may include a set of foreign words and their definitions, a phone list, a calendar, a to-do list, etc. Additional examples of menu items are shown in FIG. 7.

Specific audio instructions can be provided for the various menu items. For instance, after the user selects the "calculator" menu item, the pen device may instruct the user to draw the numbers 0-9, and the operators ±, −'x, /, and = on the sheet of paper and then select the numbers to perform a math calculation. In another example, after the user selects the "translator" menu item, the pen device can instruct the user to write the name of a second language and circle it. After the user does this, the pen device can further instruct the user to write down a word in English and then select the circled second language to hear the written word translated into the second language. After doing so, the audio output device in the pen device may recite the word in the second language.

Figure 7:
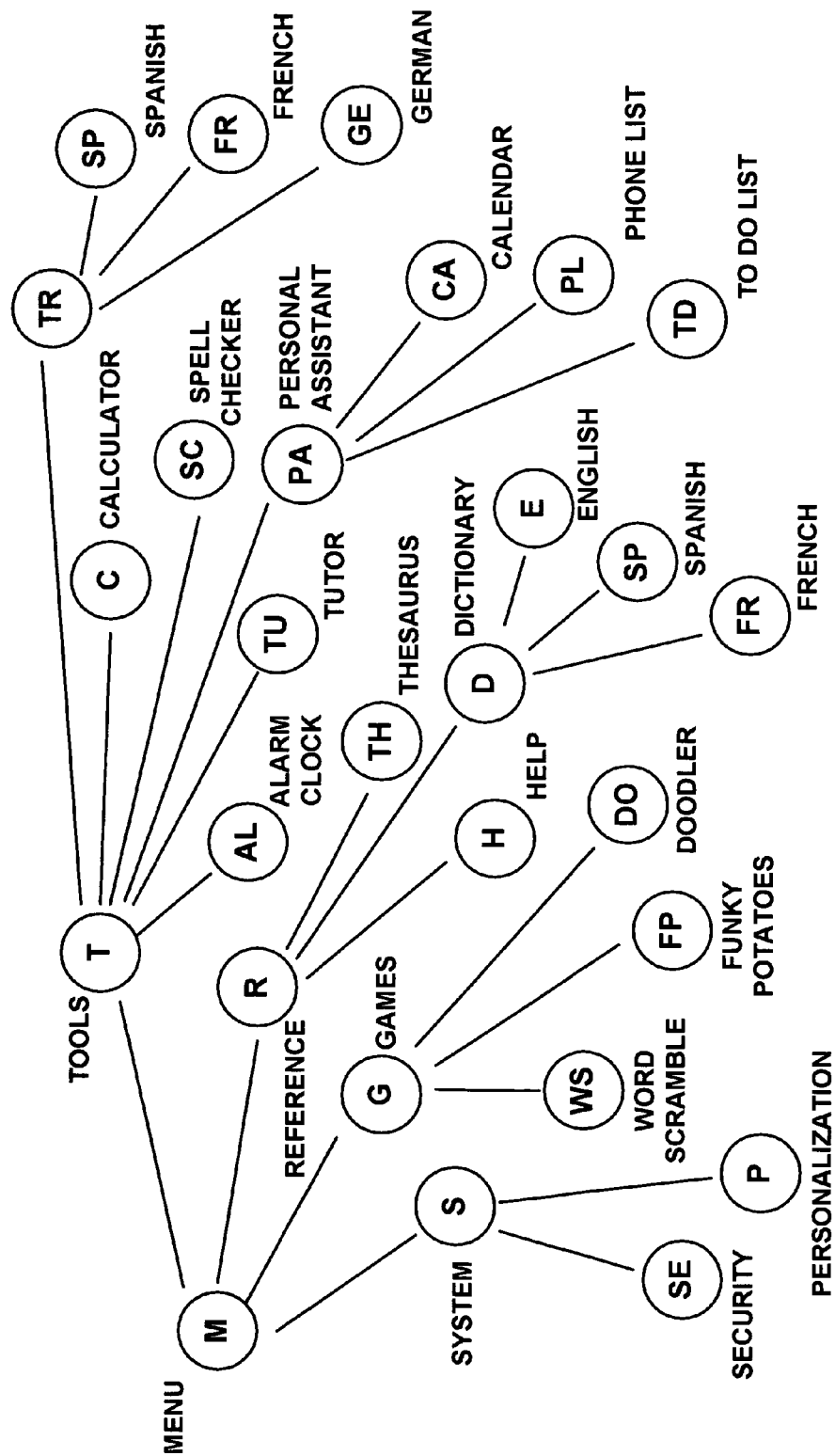
FIG. 7 shows a menu item tree directory according to an embodiment of the present invention.

FIG. 7 shows a menu item tree directory according to an embodiment of the present invention including the graphical element icon representation of each option. The menu item tree directory can embody an audio menu starting from the menu graphic element icon. Starting from the top of FIG. 7, a first audio subdirectory would be a tools T subdirectory. Under the tools T subdirectory, there could be a translator TR subdirectory, a calculator C subdirectory, a spell checker SC subdirectory, a personal assistant PA subdirectory, an alarm clock AL subdirectory, and a tutor TU function. Under the translator TR subdirectory, there would be Spanish SP, French FR, and German GE translator functions. Under the personal assistant PA subdirectory, there would be calendar C, phone list PL, and to do list TD functions or subdirectories. Under the reference R subdirectory, there could be thesaurus TH function, a dictionary D subdirectory, and a help H function. Under the dictionary D subdirectory, there can be an English E function, a Spanish SF function, and a French FR function. Under the games G subdirectory, there can be games such as word scramble WS, funky potatoes FP, and doodler DO. Other games could also be present in other embodiments of the invention. Under the system S subdirectory, there can be a security SE function, and a personalization P function.

Details pertaining to some of the above directories, subdirectories, and functions are provided below. As illustrated by the menu item tree-directory, a user may proceed or navigate down any desired path by listening to recitations of the various menu items and then selecting the menu item desired. The subsequent selection of the desired menu item may occur in any suitable manner. For example, in some embodiments, a user can cause the pen device to scroll through the audio menu by "down touching" (e.g., down-stroke) on a created graphic element. The "down touching" may be recognized by the electronics in the pen device as an "actuation" by using any suitable mechanism. For instance, the pen device may be programmed to recognize the image change associated with the downward movement of it towards the selected graphic clement.

In another example, a pressure sensitive switch may be provided in the pen device so that when the end of the pen device applies pressure to the paper, the pressure switch activates. This informs the pen device to scroll through the audio menu. For instance, after selecting the circled letter "M" with the pen device (to thereby cause the pressure switch in the pen device to activate), the audio output device in the pen device may recite "tools" and nothing more. The user may select the circled letter "M" a second time to cause the audio output device to recite the menu item "reference". This can be repeated as often as desired to scroll through the audio menu. To select a particular menu item, the user can create a distinctive mark on the paper or provide a specific gesture with the scanning apparatus. For instance, the user may draw a "checkmark" (or other graphic element) next to the circled letter "M" after hearing the word "tools" to select the subdirectory "tools". Using a method such as this, a user may navigate towards the intended directory, subdirectory, or function in the menu item tree. The creation of a different graphic element or a different gesture may be used to cause the pen device to scroll upward. Alternatively, buttons or other actuators may be provided in the pen device to scroll through the menu. Once "tools" is selected, it will function as described above, but with respect to its subdirectory menu.

In other embodiments, after creating the menu graphic element icon (e.g., letter "M" with a circle), the user may select the menu graphic element icon. Software in the scanning apparatus recognizes the circled letter as being the menu symbol and causes the scanning apparatus to recite the menu items "tools", "reference", "games", and "system" sequentially and at spaced timing intervals, without down touching by the user. Audio instructions can be provided to the user. For example, the pen device may say "To select the 'tools' directory, write the letter 'T' and circle it," To select the menu item, the user may create the letter "T" and circle it. This indicates to the pen device that the user has selected the subdirectory "tools". Then, the pen device can recite the menu items under the "tools" directory for the user. Thus, it is possible to proceed directly to a particular directory, subdirectory, or function in the menu item tree by creating a graphic element representing that directory, subdirectory, or function on a sheet and interacting there with. Alternatively, if the menu item already resides on the surface, the user can anytime interact with it to select its functions.

It should be noted that the order of items within the directories, subdirectories, option menus, etc. of the graphic element icons depicted in FIG. 7 can be changed by the user. For example, the user can access a certain application and use that application to change the order in which the items of one or more directories, subdirectories, etc., are audibly rendered. Similarly, the user can change the specific audio output associated with one or more items within a given directory/subdirectory etc. for sample, the user can record her own voice for an item, use a prerecorded song (e.g., MP3, etc.), or the like, and user according as the item's audibly rendered output. Additionally, it should be noted that additional items for one or more directories, subdirectories, etc., can be added through, for example, software/or firmware updates provided to the pen device (e.g., uploading new software based functionality).

It should be noted that a respective state of multiple instances of a graphic element icon (e.g., multiple menu icons) can be persistently associated with each specific instance. For example, in a case where two or more graphic element icons exist on a common surface (e.g., created by the user, preprinted, or the like) their state, or their particular location within their directory of options can be independently retained, or remembered, for each icon. For example, if a first menu icon is currently on option three (e.g., "games"), and a second menu icon is currently on option one (e.g., "tools"), the user can go off and perform other tasks using other applications (e.g., calculator, dictionary, etc.) and come back at some later time to either the first or second menu icon and they will correctly retain their last state (e.g., "games" for the first and "tools" for the second menu icon).

Similarly, it should be noted that a respective state of multiple instances of a graphic element icon (e.g., multiple menu icons) can be coordinated among the multiple instances and persistently associated with each specific instance. With coordinated state, where two or more graphic element icons exist on a common surface (e.g., created by the user, preprinted, or the like) their state can be remembered for each icon, but that state can be coordinated such that the options span across each instance. For example, if a first menu icon is currently on option two (e.g., "system"), a second menu icon will have its state coordinated such that it will be on option three (e.g., "tools"). The user can perform other intervening tasks and come back at some later time to either the first or second menu icon and they will correctly retain their coordinated state (e.g., "system" for the first and "tools" for the second).

Figure 9:
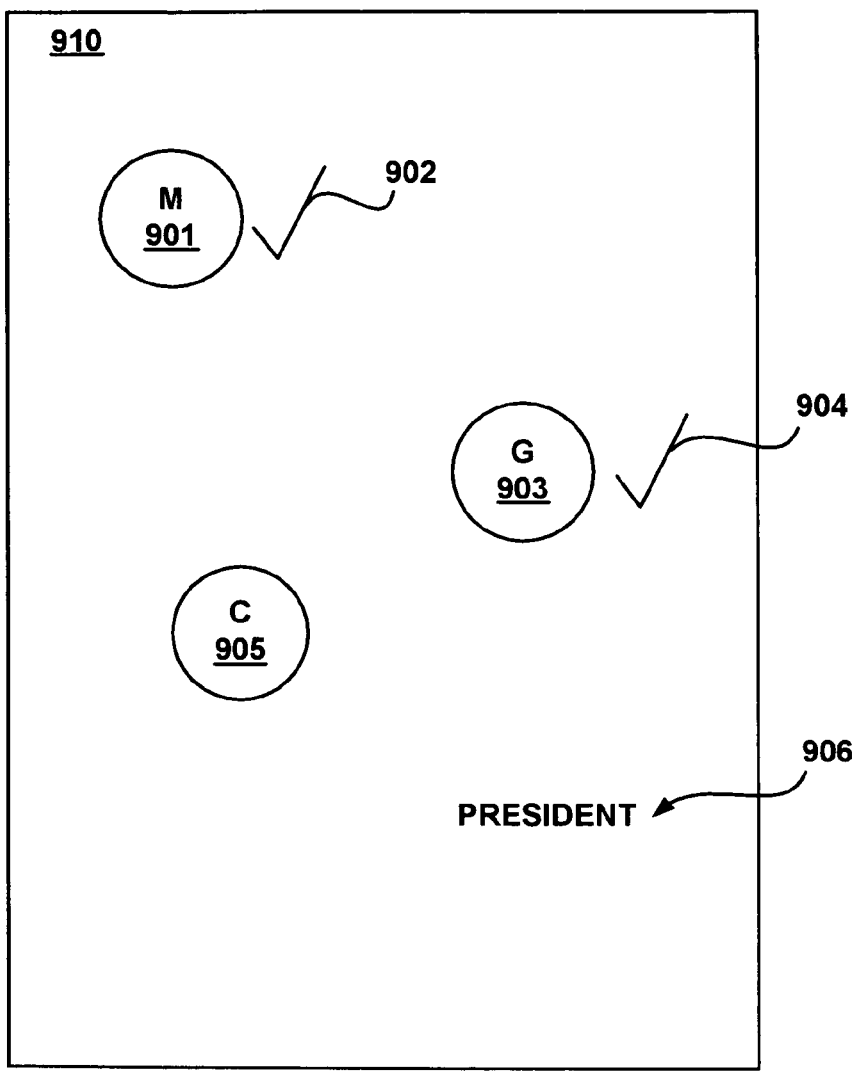
FIG. 9 shows a plurality of different types of graphical item icons on a surface in accordance with one embodiment of the present invention.

FIG. 9 shows a surface 910 (e.g., a sheet of paper) having a number of graphic element icons written thereon in accordance with one embodiment of the present invention. FIG. 9 shows examples of group graphic element icons (e.g., the menu icon "M" and the games icon "G") and an application icon (e.g., the calculator icon "C"). The graphic element icons can be written on the sheet paper 910 by the user or can be preprinted. As described above, group graphic element icons generally audibly render a list options. For example, repeatedly tapping at location 901 with the pen device 100 proceeds through the options of the menu directory (e.g., system, games, reference, and tools), as described in the discussion FIG. 7. For example, tapping twice on the menu icon will cause the pen device 100 to audibly render "system" and then audibly render "games" indicating the selection of the games subdirectory. The game subdirectory can then be activated by touching location 902 (e.g., the checkmark) and the activation can be confirmed to the user through an audio tone.

Subsequently, the pen device 100 audibly prompts the user to create (e.g. draw) a games graphic element icon as shown in FIG. 9. Repeatedly tapping the games icon at location 903 with the pen device 100 then causes the pen device 100 to proceed through the options of the games subdirectory (e.g., word scramble, funky potatoes, and doodler), as described in the discussion of FIG. 7. A selected one of the game subdirectory items can then be selected through a tap at location 904 (e.g., the checkmark associated with the games), or alternatively, drawing the checkmark if it is not already there.

Referring still to FIG. 9, a touch at the calculator icon "C" launches the calculator application. In this manner, the calculator icon does not render a list of menu items or subdirectory options, but rather directly launches an application itself, in this case the calculator application. Once the calculator application is invoked, the pen device 100 confirms the activation (e.g., by rendering an audio tone) and audibly prompts the user through a series of actions to prepare the calculator for use (e.g., by instructing the user to draw the numbers 0-9, and the operators ±, −'x, /, and = on the surface and then select the numbers to perform a math calculation).

Importantly, in the above examples, it should be noted that an OCR (optical character recognition) process needs to be performed on a mark, single character (e.g., the letter "M"), or a text string (e.g., a word) only once, as it is first written by the user (e.g., "M" shown in FIG. 9). As described above, the pen device 100 includes functionality whereby the location of the graphic elements on the surface 910 can be determined by the pen device 100 reading data encoded on the surface 910. This enables the pen device 100 to remember the location of the particular character, particular symbol, particular text string, etc. The pen device 100 can thus identify subsequent selections of a particular word by recognizing the same location of the particular word on a surface (e.g., when the user touches the pen device 100 onto the particular word at some later time). Upon subsequent selections of the word by the user, the results of the earlier performed OCR process are recalled, and these results are used by, for example, an active application (e.g., dictionary). Thus, the ability to store results of an OCR process (e.g., on words, characters, numbers, etc.), and to subsequently recall those results for use with one or more applications at a later time, greatly improves the responsiveness and the performance of the user interface implemented by embodiments of the present invention. Resource intensive OCR processing need only be performed once by the computer system resources of the pen device 100.

FIG. 9 also shows a user written word 906 (e.g., text string) created using a "prompt and believe" function of the pen device 100. In accordance with embodiments of the present invention, it should be noted that some words, text strings, marks, symbols, or other graphic elements, need not be processed at all using OCR. For example, the particular word, graphic element, etc., can be created by the user in response to an audible prompt from the pen device 100, wherein the pen device prompts the user to write the particular word (e.g., "president") and subsequently stores the location of the written word with the association (e.g., from the prompt). The subsequent selection of the created word is recognized by location in the manner described above. For example, pen device 100 can instruct the user to write the word "president" 906. In response to the prompt, the user writes the word "president" and the pen device 100 will treat, or in other words believe, upon a subsequent selection of the word that what the user wrote in response to the prompt was in fact the word "president." In other words, the pen device 100 associates the label "president" with whatever the user wrote in response to the prompt. Depending upon the application, the user can be prompted to underline the word, put a box around the word, or otherwise and some distinguishing mark/graphic element.

When the user is done writing the prompted word, the pen device 100 recognizes the fact that the user is finished by, for example, recognizing the inactivity (e.g., the user is no longer writing) as a data entry termination event. In this manner, a "timeout" mechanism can be used to recognize the end of data entry. Another termination event could be a case where the word is underlined or boxed as described above. Additional examples of termination events are described in the commonly assigned United States Patent Application "TERMINATION EVENTS", by Marggraff et al., filed on Jan. 12, 2005, and is incorporated herein in its entirety.

In this manner, the prompt-and-believe feature of embodiments of the present invention enables the creation of graphic elements having meanings that are mutually understood between the user and the pen device 100. Importantly, it should be understood that there is no OCR processing being done on the word president. Graphic elements created using the "prompt-and-believe" function can be associated with labels for other applications, options, menus, functions etc., whereby selection of the prompt-and-believe graphic element (e.g. by tapping) can invoke any of the above. Reducing the requirement for OCR processing lowers the computational demands on the pen device 100 and thus improves the responsiveness of the user interface.

Although embodiments of the present invention have been described in the context of using surfaces encoded with markings in order to determine location of the pen device, it should be noted that embodiments of the present invention are suitable for use with pen devices that determine location using other means that do not require encoded surfaces. For example, in one embodiment, a pen device can incorporate one or more position location mechanisms such as, for example, motion sensors, gyroscopes, etc., and be configured to accurately store a precise location of a given surface (e.g., a sheet of paper). The precise location of the surface can be stored by, for example, sequentially touching opposite corners of the surface (e.g., a rectangular sheet of paper). The pen device would then recognize the location of graphic elements written by the user on the surface by comparing the stored precise location of the surface with the results of its location determination means.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A pen device method for interpreting user commands, comprising:

said pen device prompting a user to write a first expected graphical element;

said pen device receiving data indicative of a first user created graphical element written on a surface and receiving a position on said surface of said first user created graphical element without recognizing a content of said first user created graphical element;

associating an interactive function with said position, wherein said interactive function is related to said first expected graphical element;

responsive to said pen device interacting with said position, said pen device executing said interactive function within said pen device, wherein said executing causes said pen device to render an output that is unique to said first expected graphical element regardless of said content of said first user created graphical element; and enabling a subsequent access and execution of the interactive function in response to a subsequent selection of the first user created graphical element.

2. The method of claim 1, wherein the output comprises an audio output related to the interactive function.

3. The method of claim 1, wherein the storing of the association of the interactive function with said position of the first user created graphical element implements a persistent availability of the interactive function, for a predetermined amount of time, via interaction with said position of the first graphical element.

4. The method of claim 1, wherein the first user created graphical element is created by a pen device on the surface.

5. The method of claim 4, wherein the surface comprises a sheet of paper.

6. The method of claim 1, further comprising:
accessing one of a plurality of functions related to the first expected graphical element by interpreting at least one actuation of the first user created graphical element, wherein at least one actuation selects the one of the plurality of functions.

7. The method of claim 6, wherein the at least one actuation comprises recognizing at least one tap of the first user created graphical element.

8. The method of claim 6, further comprising:
providing one of a plurality of audio outputs when the one of the plurality of functions is selected.

9. The method of claim 6, wherein the plurality of functions comprises a predetermined menu of options.

10. The method of claim 6, wherein the plurality of functions comprises a plurality of configuration options of an application related to the first expected graphical element.

11. The method of claim 10, wherein at least one of the plurality of configuration options comprises a default configuration of the application.

12. The method of claim 1, further comprising:
implementing a hierarchy of functions; and
providing access to the hierarchy of functions via a corresponding hierarchy of graphical elements.

13. The method of claim 12, further comprising:
recognizing at least one actuation of the first user created graphical element to select a first hierarchical level function;
prompting the creation of a second expected graphical element;
receiving data indicative of a second user created graphical element written on a surface and receiving a position on said surface of said second user created graphical element without recognizing a content of said second user created graphical element;
associating a second hierarchical level function with said position of said second user created graphical element, wherein said second hierarchical level function is related to said second expected graphical element;
recognizing at least one actuation of the second user created graphical element to select said second hierarchical level function;
providing an audio output related to the second hierarchical level function; and
associating the second hierarchical level function with said position of the second graphical element.

14. The method of claim 1, further comprising:
said pen device recognizing a second graphical element on said surface;
said pen device tracking a state of said first user created graphical element to retain a location of said interactive function within a directory associated with said interactive function; and
said pen device tracking a state of said second graphical element to retain a location of a second interactive function within a directory associated with said second interactive function.

15. The method of claim 1 further comprising:
said pen device recognizing a second user created graphical element.

16. The method of claim 1, wherein said prompt is an audio instruction from said pen device.

17. A pen device method for interpreting user commands, comprising:
said pen device prompting a user to write a first expected graphical element;
said pen device receiving data indicative of a first user created graphical element written on a surface and receiving a position on said surface of said first user created graphical element without recognizing a content of said first user created graphical element;
associating an interactive function with said position, wherein said interactive function is related to said first expected graphical element;
responsive to said pen device interacting with said position, said pen device executing said interactive function within said pen device, wherein said executing causes said pen device to render an output that is unique to said first expected graphical element regardless of said content of said first user created graphical element; and
enabling a subsequent access and execution of the interactive function in response to a subsequent selection of said first user created graphical element by storing an association of the interactive function with said position of said first user created graphical element icon written on said surface, wherein the storing of the association implements a persistent availability of the interactive function for a predetermined amount of time, via interaction with the first user created graphical element.

18. The method of claim 17, wherein the first user created graphical element is created by a pen device on the surface.

19. The method of claim 18, wherein the surface comprises a sheet of paper.

20. The method of claim 17, further comprising:
accessing one of a plurality of functions related to the first expected graphical element by interpreting at least one actuation of the first user created graphical element, wherein at least one actuation selects the one of the plurality of functions.

21. The method of claim 20, wherein the at least one actuation comprises recognizing at least one tap of the first user created graphical element.

22. The method of claim 20, further comprising:
providing one of a plurality of audio outputs when the one of the plurality of functions is selected.

23. The method of claim 20, wherein the plurality of functions comprises a predetermined menu of options including one or more applications.

24. The method of claim 20, wherein the plurality of functions comprises a plurality of configuration options of an application related to the first expected graphical element.

25. The method of claim 24, wherein at least one of the plurality of configuration options comprises a default configuration of the application.

26. The method of claim 17, further comprising:
implementing a hierarchy of functions; and
providing access to the hierarchy of functions via a corresponding hierarchy of graphical elements.

27. The method of claim 17, further comprising:
providing at least one audio tip related to the interactive function to indicate an operating manner of the interactive function.

28. The method of claim 26, further comprising:
recognizing at least one actuation of the first user created graphical element to select a first hierarchical level function;
prompting the creation of a second expected graphical element;
receiving data indicative of a second graphical element and receiving a position on said surface thereof without recognizing a content of said second graphical element;
associating a second hierarchical level function with said position of said second graphical element, wherein said second hierarchical level function is related to said second expected graphical element;
recognizing at least one actuation of the second graphical element to select said second hierarchical level function;
providing an audio output related to the second hierarchical level function; and
associating the second hierarchical level function with said position of the second graphical element.

29. A pen device comprising:
an optical sensor for detecting images from a surface;
a processor coupled to the sensor; and
a memory coupled to the processor, the memory storing instructions that when executed cause the pen device to implement a method for interpreting user commands, comprising:
said pen device prompting a user to write a first expected graphical element;
receiving data indicative of a first user created graphical element written on the surface and receiving a position on said surface of said user created graphical element without recognizing a content of said first user created graphical element;
associating an interactive function with said position, wherein said interactive function is related to said first expected graphical element;
responsive to said pen device interacting with said position, executing said interactive function within said pen device;
responsive to said executing, rendering an output that is unique to said first expected graphical element regardless of said content of said first user created graphical element; and
enabling a subsequent access and execution of the interactive function in response to a subsequent selection of the first user created graphical element.

30. The device of claim 29, wherein the output comprises an audio output related to the interactive function.

31. The device of claim 29, wherein the association of the interactive function with the position of said first user created graphical element implements a persistent availability of the interactive function, for a predetermined amount of time, via interaction with the first user created graphical element.

32. The device of claim 29, further comprising a writing instrument and wherein the graphical element is created by the writing instrument on the surface.

33. The device of claim 32 wherein the surface comprises a sheet of paper.

34. The device of claim 29 wherein the method further comprises:
accessing one of a plurality of functions related to the first expected graphical element by interpreting at least one actuation of the first user created graphical element, wherein the at least one actuation selects the one of the plurality of functions.

35. The device of claim 34, wherein the at least one actuation comprises recognizing at least one tap of the first user created graphical element.

36. The device of claim 34, wherein the method further comprises:
providing one of a plurality of audio outputs when the one of the plurality of functions is selected.

37. The device of claim 34, wherein the plurality of functions comprises a predetermined menu of options.

38. The device of claim 34, wherein the plurality of functions comprises a plurality of configuration options of an application related to the first expected graphical element.

39. The device of claim 38, wherein at least one of the plurality of configuration options comprises a default configuration of the application.

40. The device of claim 29, wherein the method further comprises:
implementing a hierarchy of functions; and
providing access to the hierarchy of functions via a corresponding hierarchy of graphical elements.

41. The device of claim 40, wherein the method further comprises:
recognizing at least one actuation of the first user created graphical element to select a first hierarchical level function;
prompting the creation of a second expected graphical element;
receiving data indicative of a second graphical element and receiving a position on said surface thereof without recognizing a content of said second graphical element;
associating a second hierarchical level function with said position of said second graphical element, wherein said second hierarchical level function is related to said second expected graphical element;
recognizing at least one actuation of the second graphical element to select said second hierarchical level function;
providing an audio output related to the second hierarchical level function; and
associating the second hierarchical level function with the position of said second graphical element.

42. The device of claim 29, wherein the method further comprises:
providing at least one audio tip related to the function to indicate an operating manner of the function.

43. A method of interacting with a pen based computer system, said method comprising:
said pen recognizing selection of a first graphical element on a writable surface without recognizing a content of said first graphical element, said selection performed using a writing instrument of said pen based computer system;
said pen in response to said selection, executing a first interactive function associated with a first expected graphical element at a position of said first graphical element regardless of said content of said first graphical element;
said pen in response to said executing said first interactive function, audibly rendering a listing of first options associated with said first expected graphical element, wherein said first options are operable to be invoked by said pen based computer system, wherein said audible rendering is unique to said first interactive function;

said pen in response to a selection of one of said first options, invoking said one of said first options; and said pen enabling a subsequent access and execution of said first interactive function in response to a subsequent selection of said first graphical element.

44. A method as described in claim 43 wherein said first options comprise at least one application to be invoked.

45. A method as described in claim 43 wherein said one of said first options is an application program resident on said pen based computer system.

46. A method as described in claim 43 wherein said audibly rendering said listing of said first options comprises audibly rendering, one at a time, each of said first options in a round-robin fashion, in response to selections of said first graphical element by said writing instrument.

47. A method as described in claim 46 further comprising identifying a selection of said one of said first options in response to said writing instrument selecting a portion of said first graphical element after said one of said first options is audibly rendered.

48. A method as described in claim 47 wherein said portion of said first graphical element is a symbol of a check mark.

49. A method as described in claim 43 wherein said first graphical element is user written on said surface and further comprising automatically identifying said position of said first graphical element and wherein said automatically identifying said first graphical element is performed using a processor of said pen based computer system.

50. A method as described in claim 43 wherein said first graphical element is pre-printed on said surface.

51. A method as described in claim 43 wherein said first expected graphical element is a menu item and wherein said first options are submenu items within a hierarchy of options operable to be invoked by said pen based computer system.

52. A method as described in claim 43 wherein said first options comprise an option having an associated second expected graphical element and further comprising:

recognizing selection of a second graphical element on said writable surface without recognizing a content of said second graphical element, said selection performed using said writing instrument of said pen based computer system;

in response to said selection, executing a second interactive function related to said second expected graphical element;

said pen in response to said executing said second interactive function, audibly rendering a listing of second options associated with said second expected graphical element, wherein said second options are operable to be invoked by said pen based computer system, wherein said audible rendering is unique to said second interactive function; and in response to a selection of one of said second options, invoking said one of said second options.

53. A method as described in claim 52 wherein said second options comprise at least one application to be invoked.

54. A method as described in claim 52 wherein said one of said second options is an application program resident on said pen based computer system.

55. A method as described in claim 52 wherein said audibly rendering said listing of said second options comprises audibly rendering, one at a time, each of said second options in a round-robin fashion, in response to selections of said second graphical element by said writing instrument.

56. A method as described in claim 55 further comprising identifying selection of said one of said second options by responding to said writing instrument selecting a portion of said second graphical element after said one of said second options is audibly rendered.

57. A method as described in claim 52 wherein said second graphical element is user written on said surface and further comprising automatically identifying a position of said second graphical element, and wherein said automatically identifying said position of said second graphical element is performed using a processor of said pen based computer system.

58. A pen based computer system comprising:

a writing instrument;

a speaker;

a memory unit coupled to a bus;

an optical sensor coupled to said bus; and a processor coupled to said bus and comprising instructions that when executed implement a method of interacting with a user comprising:

said pen recognizing selection of a first graphical element on a writable surface without recognizing a content of said first graphical element, said selection performed using said writing instrument;

said pen in response to said selection, executing a first interactive function associated with a first expected graphical element at a position of said first graphical element regardless of said content of said first graphical element;

said pen in response to said executing said first interactive function, audibly rendering, via said speaker, a listing of first options associated with said first expected graphical element wherein said first options are operable to be invoked by said pen based computer system, wherein said audible rendering is unique to said first interactive function;

said pen in response to a selection of one of said first options, invoking said one of said first options; and said pen enabling a subsequent access and execution of said first interactive function in response to a subsequent selection of said first graphical element.

59. A system as described in claim 58 wherein said one of said first options is an application program resident on said pen based computer system.

60. A system as described in claim 58 wherein said audibly rendering said listing of said first options comprises audibly rendering, one at a time, each of said first options in a round-robin fashion, in response to selections of said first graphical element by said writing instrument.

61. A system as described in claim 60 wherein said method further comprises identifying selection of said one of said first options in response to said writing instrument selecting a portion of said first graphical element after said one of said first options is audibly rendered.

62. A system as described in claim 61 wherein said portion of said first graphical element is a symbol of a check mark.

63. A system as described in claim 58, wherein said first graphical element is user written on said surface, and wherein said method further comprises automatically identifying said position of said first graphical element, and wherein said automatically identifying said position of said first graphical element is performed using said processor of said pen based computer system.

64. A system as described in claim 58, wherein said first graphical element is a menu item, and wherein said first options are submenu items within a hierarchy of options operable to be invoked by said pen based computer system.

65. A system as described in claim 58 wherein said first options comprise an option having an associated second expected graphical element and wherein said method further comprises:
  recognizing selection of a second graphical element on said writable surface without recognizing a content of said second graphical element, said selection performed using said writing instrument;
  in response to said selection, executing a second interactive function related to said second expected graphical item;
  in response to said executing said second interactive function, audibly rendering, via said speaker, a listing of second options associated with said second expected graphical item, wherein said second options are operable to be invoked by said pen based computer system, wherein said audible rendering is unique to said second interactive function; and
  in response to a selection of one of said second options, invoking said one of said second options.

66. A system as described in claim 65 wherein said one of said second options is an application program resident on said pen based computer system.

67. A system as described in claim 65 wherein said audibly rendering said listing of said second options comprises audibly rendering, one at a time, each of said second options in a round-robin fashion, in response to selections of said second graphical element by said writing instrument.

68. A system as described in claim 67 wherein said method further comprises identifying a selection of said one of said second options by responding to said writing instrument selecting a portion of said second graphical element after said one of said second options is audibly rendered.

69. A system as described in claim 65 wherein said second graphical item is user written on said surface, and wherein said method further comprises automatically identifying a position of said second graphical item, and wherein said automatically identifying said position of said second graphical icon is performed using said processor of said pen based computer system.

70. A pen device method for accepting user input to implement a function, comprising:
  said pen device prompting a user to write an expected graphical element;
  said pen device receiving data indicative of a user created graphical element written on a surface and receiving a position on said surface of said user created graphical element without recognizing a content of said user created graphical element, wherein said position is a user selected position;
  associating an interactive function with said position, wherein said interactive function is related to said expected graphical element, and wherein said associating corresponds said interactive function to said user created graphical element, and wherein said associating enables a subsequent access and execution of said interactive function responsive to a subsequent selection of said user created graphical element; and
  responsive to said pen device interacting with said position, said pen device executing said interactive function within said pen device, wherein said executing causes said pen device to render an output that is unique to said expected graphical element regardless of said content of said user created graphical element.

71. The method of claim 70, wherein the output comprises an audio output related to the interactive function.

72. The method of claim 70, wherein the output is provided via a second device in communication with the pen device.

73. The method of claim 70, wherein the output comprises a visual output related to the interactive function.

74. The method of claim 73, wherein the visual output is provided via a second device in communication with the pen device.

75. The method of claim 70, wherein the user created graphical element icon is created by a pen device on the surface.

76. The method of claim 75, wherein a graphical element is created by:
  recognizing a user written character on the surface; and
  recognizing a user written circle enclosing the character.

77. The method of claim 76, further comprising:
  initiating an OCR process on the character upon an upstroke of the pen device after the user written circle.

78. The method of claim 76, further comprising:
  recognizing a user written check mark within a predetermined distance to the graphical element; and
  associating the check mark with the graphical element.

79. The method of claim 78, wherein the check mark is configured to invoke one of a plurality of functions selected by the graphical element.

80. The method of claim 70, wherein the surface comprises a sheet of paper.

81. The method of claim 70, wherein the surface comprises an electronically active surface.

82. The method of claim 81, wherein the electronically active surface comprises a display of a tablet PC.

83. The method of claim 70, further comprising:
  accessing one of a plurality of functions related to the expected graphical element by interpreting at least one actuation of the user created graphical element, wherein the at least one actuation selects the one of the plurality of functions.

84. The method of claim 83, wherein an order of the plurality of functions is user configurable.

85. The method of claim 83, wherein at least one new function can be added to the plurality of functions via a software update or a firmware update.

86. The method of claim 83, further comprising:
  providing one of a plurality of audio outputs when the one of the plurality of functions is selected, and wherein the audio output is user configurable.

87. The method of claim 70, further comprising:
  said pen device accessing a plurality of functions by recognizing an interaction with a corresponding plurality of respective graphical elements; and
  said pen device maintaining a respective state for each of the plurality of functions, the respective state resulting from the interaction.

88. The method of claim 70, further comprising:
  said pen device accessing a plurality of instances of a single function by recognizing an interaction with a corresponding plurality of respective graphical elements corresponding to each instance; and
  said pen device maintaining a respective independent state for each of the plurality of instances.

89. The method of claim 88, wherein at least one of the plurality of graphical elements is preprinted and at least one of the plurality of graphical elements is user created.

90. The method of claim 70, further comprising:
  said pen device accessing a plurality of instances of a single function by recognizing an interaction with a corresponding plurality of respective graphical elements corresponding to each instance; and said pen device maintaining a coordinated state for each of the plurality of instances.

91. The method of claim 90, wherein at least one of the plurality of graphical elements is preprinted and at least one of the plurality of graphical elements is user created.

92. The method of claim 70, further comprising:

said pen device prompting the creation of a graphical element by providing a prompt related to a label for the graphical element;

said pen device recognizing a termination of the creation of the graphical element; and said pen device associating the label with the graphical element.

93. The method of claim 92, further comprising:

said pen device associating a function with the graphical element, wherein the function is related to the label.

94. The method of claim 92, wherein the label is associated with the graphical element without performing an OCR (optical character recognition) process on the graphical element.

95. The method of claim 70, further comprising:

said pen device recognizing said position of the created graphical element on the surface by using position determination means within a pen device, and wherein the position determination means is configured to determine the location without requiring position code on the surface.

* * * * *